(12) United States Patent
Cho et al.

(10) Patent No.: US 11,758,113 B2
(45) Date of Patent: Sep. 12, 2023

(54) DISPLAY DEVICE

(71) Applicant: Samsung Display Co., LTD., Yongin-si (KR)

(72) Inventors: Hyun Jin Cho, Seoul (KR); Beom Shik Kim, Yongin-si (KR); Jae Joong Kwon, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 6 days.

(21) Appl. No.: 17/023,162

(22) Filed: Sep. 16, 2020

(65) Prior Publication Data
US 2021/0274153 A1 Sep. 2, 2021

(30) Foreign Application Priority Data
Feb. 28, 2020 (KR) .......................... 10-2020-0025100

(51) Int. Cl.
*H04N 13/305* (2018.01)
*G02B 30/29* (2020.01)

(52) U.S. Cl.
CPC .......... *H04N 13/305* (2018.05); *G02B 30/29* (2020.01)

(58) Field of Classification Search
CPC ............................ G02B 30/27; G02B 27/0172; G02B 27/0983; G02B 5/3041; G02B 3/005; G02B 30/29; G02B 3/0043; G02B 19/0028; G02B 3/0006; G02B 30/36; G02B 3/0062; G02B 3/0037; H04N 13/305; H04N 13/317; H04N 13/307
See application file for complete search history.

(56) References Cited

U.S. PATENT DOCUMENTS

| 10,136,125 | B2 | 11/2018 | Yoon et al. | |
|---|---|---|---|---|
| 2014/0152556 | A1* | 6/2014 | Ohbitsu | G02B 30/27 345/156 |
| 2016/0077348 | A1* | 3/2016 | Kang | H04N 13/31 359/463 |
| 2018/0231812 | A1* | 8/2018 | Tan | G02F 1/133526 |

FOREIGN PATENT DOCUMENTS

| KR | 100583038 | 5/2006 |
|---|---|---|
| KR | 100618456 | 8/2006 |
| KR | 101350310 | 1/2014 |
| KR | 101579072 | 12/2015 |
| KR | 1020190036102 | 4/2019 |

* cited by examiner

*Primary Examiner* — Farhan Mahmud
(74) *Attorney, Agent, or Firm* — CANTOR COLBURN LLP

(57) ABSTRACT

A display device includes a display panel including a plurality of pixels each including a light emitting layer, and a stereoscopic lens including a curved base disposed on a surface of the display panel with a predetermined radius of curvature, and a plurality of lenses disposed on the curved base and inclined from a side of the display panel. A thickness of the curved base of the stereoscopic lens increases as a distance from a center of the stereoscopic lens increases.

9 Claims, 19 Drawing Sheets

FIG. 1
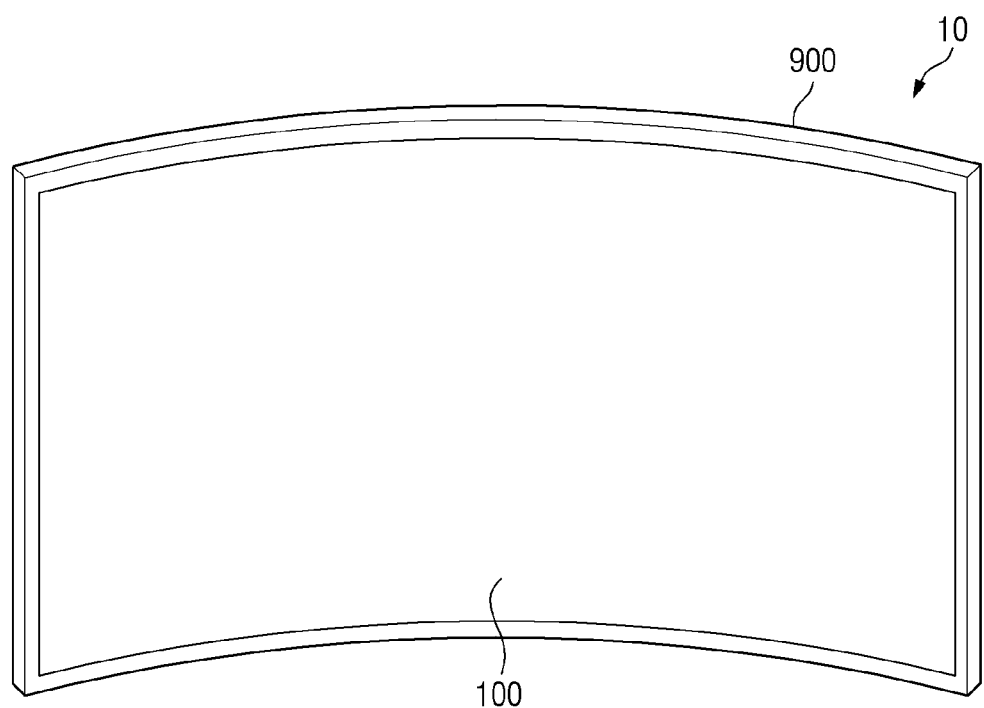
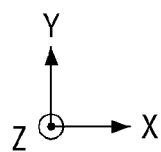

FIG. 2
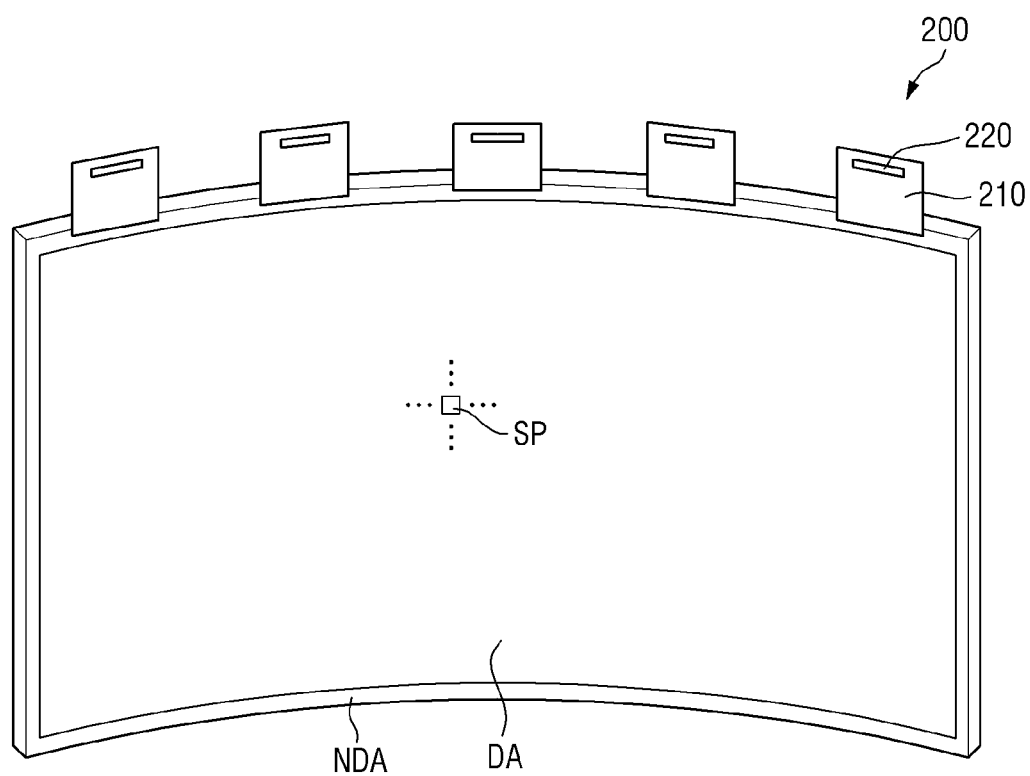
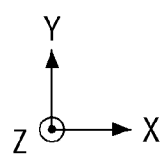

FIG. 10
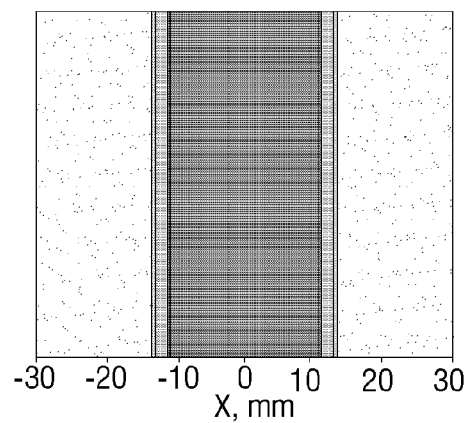
⇐ Image of 320-1
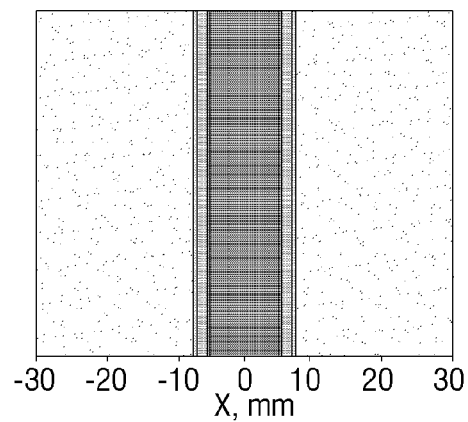
⇐ Image of 320-n
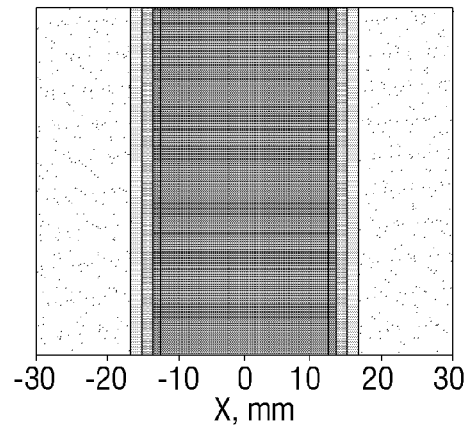
⇐ Image of 320-1 and 320-n P: P2 ~ Pn

DISPLAY DEVICE

This application claims priority to Korean Patent Application No. 10-2020-0025100 filed on Feb. 28, 2020, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Three dimensional ("3D") display technology is divided into a stereoscopic technique and an auto-stereoscopic technique. The stereoscopic technique utilizes parallax images between left and right eyes, which provide a large stereoscopic effect. The stereoscopic technique includes a glass method and a glass-free method, both of which have been put into practical use. According to the glass method, a left-eye image and a right-eye image having different polarizations are displayed on a direct view type display or a projector screen, so that a viewer with polarization glasses may see a stereoscopic image. Alternatively, a left-eye image and a right-eye image are displayed by time-multiplexing, so that a viewer with shutter glasses may see a stereoscopic image. According to the glass-free method, the optical axis of a left-eye image is separated from the optical axis of a right-eye image using an optical plate such as a parallax barrier and a lenticular sheet, so that a viewer may see a stereoscopic image without glasses.

A glasses-free display device may include a 3D light control device such as a lenticular lens, a parallax barrier, a switchable barrier, and a switchable lens. The glass-free display device may appropriately control light emitted from the pixels of the display panel using a 3D light control device, and may define a video area at the optimal viewing distance to implement a 3D image. The video area may include n views, where n is a natural number equal to or greater than two.

SUMMARY

Features of the invention provide a display device including a display panel bent with a predetermined radius of curvature, and a stereoscopic lens disposed on a surface of the display panel and that matches the observation points of a plurality of lenses by adjusting at least one of the thickness of a base of the stereoscopic lens, the radius of curvature of each of the plurality of lenses, the thickness of each of the plurality of lenses and a lens pitch.

It should be noted that the invention is not limited to the above-mentioned features, and other embodiments of the invention will be apparent to those skilled in the art from the following descriptions.

An embodiment of the invention provides a display device including a display panel including a plurality of pixels each including a light emitting layer, and a stereoscopic lens including a curved base disposed on a surface of the display panel with a predetermined radius of curvature, and a plurality of lenses disposed on the curved base and inclined from a side of the display panel. A thickness of the curved base of the stereoscopic lens increases as a distance from a center of the stereoscopic lens increases.

In an embodiment, a radius of surface curvature of each of the plurality of lenses may increase as a distance from the center of the stereoscopic lens increases.

In an embodiment, a thickness of each of the plurality of lenses may decrease as a distance from the center of the stereoscopic lens increases.

In an embodiment, a distance between the light emitting layer and each of the plurality of lenses may increase as a distance from a center of the display panel increases.

In an embodiment, video areas of each of the plurality of lenses may be overlapped each other. A width of video areas of each of the plurality of lenses may be reduced as a distance from the center of the stereoscopic lens increases.

In an embodiment, the thickness of the curved base of the stereoscopic lens may be determined based on a refractive index of the curved base, a refractive index between the light emitting layer and the curved base, a distance between the light emitting layer and the curved base, a refractive index of the plurality of lenses, a thickness of each of the plurality of lenses, and an object distance of each of the plurality of lenses.

In an embodiment, the thickness of the curved base of the stereoscopic lens may be determined according to following equation:

$$T1 = n1 \times \left\{ d1 - \left( \frac{T2}{n2} + \frac{T3}{n3} \right) \right\}$$

where T1 denotes the thickness of the curved base of the stereoscopic lens, n1 denotes the refractive index of the curved base, d1 denotes the object distance of each of the plurality of lenses, T2 denotes the distance between the light emitting layer and the curved base, n2 denotes the refractive index between the light emitting layer and the curved base, T3 denotes the thickness of each of the plurality of lenses, and n3 denotes the refractive index of the plurality of lenses.

In an embodiment, a thickness of each of the plurality of lenses may be determined based on a radius of surface curvature of each of the plurality of lenses and a lens pitch.

In an embodiment, the thickness of each of the plurality of lenses may be determined according to following equation:

$$T3 = R1 - \sqrt{R1^2 - \left(\frac{P}{2}\right)^2}$$

where T3 denotes the thickness of each of the plurality of lenses, R1 denotes the radius of surface curvature of each of the plurality of lenses, and P denotes the lens pitch.

An embodiment of the invention provides a display device including a display panel including a plurality of pixels each including a light emitting layer and curved with a predetermined radius of curvature, and a stereoscopic lens including a base disposed on a surface of the display panel, and a plurality of lenses disposed on the curved base and inclined from a side of the display panel. Lens pitches of the plurality of lenses are all substantially equal. The lens pitches are distances between lens centers of adjacent lenses of the plurality of lenses, and where an extended line passing through the lens center of each of the plurality of lenses and a pixel center of the display panel corresponding to the lens center reaches a target observation point.

In an embodiment, radii of surface curvature of the plurality of lenses may be all substantially equal. Lens centers of each of the plurality of lenses may be disposed on a curve having a predetermined radius of curvature.

In an embodiment, thicknesses of the plurality of lenses may be all substantially equal. A thickness of the curved base of the stereoscopic lens may be uniform.

In an embodiment, the lens pitches may be determined based on a length of a lens area of the stereoscopic lens and a number of the plurality of lenses. The length of the lens area of the stereoscopic lens may correspond to a length of a curve from an outermost lens center adjacent to an edge of the stereoscopic lens to the outermost lens center adjacent to an opposite edge of the stereoscopic lens.

In an embodiment, the length of the lens area of the stereoscopic lens may be determined according to following equation:

$$B = 2(R-L)\theta'$$

where B denotes the length of the lens area, R-L denotes the distance between an origin of the predetermined radius of curvature of the display panel and the outermost lens center, and θ' denotes an angle between a straight line passing through the origin of the predetermined radius of curvature of the display panel and the outermost lens center and a reference line passing through the origin of the predetermined radius of curvature of the display panel.

In an embodiment of the invention, a display device includes a display panel including a plurality of pixels each including a light emitting layer and curved with a predetermined radius of curvature, and a stereoscopic lens including a base disposed on a surface of the display panel, and a plurality of lenses disposed on the curved base and inclined from a side of the display panel. A plurality of lens pitches increases as a distance from a center of the stereoscopic lens increases, where the lens pitches are distances between lens centers of adjacent lenses of the plurality of lenses.

In an embodiment, an extended line passing through the lens center of each of the plurality of lenses and a pixel center of the display panel corresponding to the lens center may reach a target observation point.

In an embodiment, an angle between a straight line passing through the lens center of each of the plurality of lenses and an origin of the predetermined radius of curvature of the display panel and a reference line passing through the origin of the predetermined radius of curvature of the display panel may be determined according to following equation:

$$\theta' = \alpha - \sin^{-1}\left(\frac{\sin(180-\alpha)}{R-L} \times Y\right)$$

where θ' denotes the angle between the straight line passing through the lens center of each of the plurality of lenses and the origin of the predetermined radius of curvature of the display panel and the reference line passing through the origin of the predetermined radius of curvature of the display panel, α denotes an angle between a straight line passing through the target observation point and the lens center of each of the plurality of lenses and the reference line passing through the origin, R denotes the predetermined radius of curvature of the display panel, L denotes a distance between each of the plurality of lenses and the light emitting layer, and Y denotes a distance between the origin and the target observation point.

In an embodiment, an angle between a straight line passing through the target observation point and the pixel center of the display panel and a reference line passing through an origin may be determined according to following equation:

$$\alpha = \tan^{-1}\frac{x'}{y'-Y}$$

where α denotes the angle between the straight line passing through the target observation point and the lens center of each of the plurality of lenses and the reference line passing through the origin, x' denotes an x-axis coordinate of the pixel center, y' denotes a y-axis coordinate of the pixel center, and Y denotes a distance between the origin and target observation point.

In an embodiment, an angle between a straight line passing through an origin of the predetermined radius of curvature of the display panel and the lens center of each of the plurality of lenses and a straight line passing through the target observation point and the lens center may be determined according to following equation:

$$\beta = \sin^{-1}\left(\frac{\sin(180-\alpha)}{R-L} \times Y\right)$$

where β denotes the angle between the straight line passing through the origin of the predetermined radius of curvature of the display panel and the lens center of each of the plurality of lenses and the straight line passing through the target observation point and the lens center, α denotes an angle between the straight line passing through the target observation point and the lens center of each of the plurality of lenses and a reference line passing through the origin, R denotes the predetermined radius of curvature of the display panel, L denotes a distance between each of the plurality of lenses and the light emitting layer, and Y denotes a distance between the origin and the target observation point.

In an embodiment, coordinates of the pixel center of the display panel may be determined according to following equation:

$$(x', y'Z) = (R \sin \theta, R \cos \theta)$$

where x' denotes an x-axis coordinate of the pixel center, y' denotes a y-axis coordinate of the pixel center, R denotes the predetermined radius of curvature of the display panel, and θ denotes an angle between a straight line passing through the pixel center of the display panel and an origin of the predetermined radius of curvature and a reference line passing through the origin.

An embodiment of the invention provides a display device including a display panel bent with a predetermined radius of curvature, and a stereoscopic lens disposed on a surface of the display panel. When a stereoscopic lens attached to a flat display panel has an observation point, observation points of a plurality of lenses may become different when the stereoscopic lens is curved together time the display panel. In this regard, the display device matches different observation points of the plurality of lenses by adjusting at least one of the thickness of a base of the stereoscopic lens, the predetermined radius of curvature of each of the plurality of lenses, the thickness of each of the plurality of lenses and a lens pitch, thereby displaying a stereoscopic image.

It should be noted that effects of the invention are not limited to those described above and other effects of the invention will be apparent to those skilled in the art from the following descriptions.

BRIEF DESCRIPTION OF THE DRAWINGS

The above and other embodiments and features of the invention will become more apparent by describing in detail embodiments thereof with reference to the attached drawings, in which:

FIG. 1 is a perspective view of an embodiment of a display device according to the invention.

FIG. 2 is a perspective view showing an embodiment of a display panel of a display device according to the invention.

FIG. 10 shows views showing an embodiment of a video area by the outermost lens and a video area by the central lens overlapped each other in a display device according to the invention.

DETAILED DESCRIPTION

Figure 3:
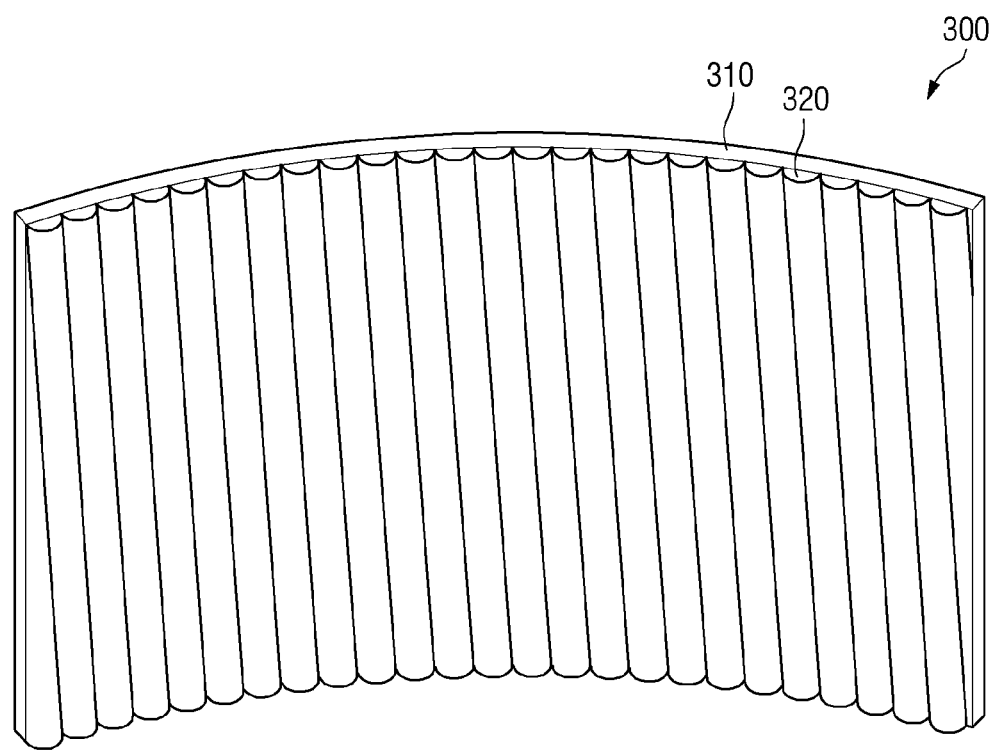
FIG. 3 is a perspective view showing an embodiment of a stereoscopic lens of a display device according to the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. Specific shapes, configurations, and characteristics of an embodiment may be used or implemented in another embodiment without departing from the inventive concepts, for example.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. Two consecutively described processes may be performed substantially at the same time or performed in an order opposite to the described order, for example. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to cross-sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an embodiment of a display device according to the invention. FIG. 2 is a perspective view showing an embodiment of a display panel of a display device according to the invention. FIG. 3 is a perspective view showing an embodiment of a stereoscopic lens of a display device according to the invention.

Referring to FIGS. 1 to 3, a display device 10 may be implemented as a flat panel display device such as a liquid-crystal display ("LCD") device, a field emission display ("FED") device, a plasma display panel ("PDP") device, and an organic light-emitting display ("OLED") device. In an embodiment, the display device may be a curved display device capable of displaying stereoscopic images, for example.

The display device 10 may include a cover window 100, a display panel 200, a stereoscopic lens 300, and a cover frame 900.

The cover window 100 may cover the top surface of the display device 10. The cover window 100 is disposed on the stereoscopic lens 300 to protect the display device 10. The cover window 100 may include a transmissive portion displaying images of the display panel 200 and a non-transmissive portion other than the transmissive portion. In an embodiment, the non-transmissive portion of the cover window 100 may be opaque so that a user cannot see other elements except images on the display panel 200, for example. In another embodiment, the non-transmissive portion of the cover window 100 may be implemented as a decoration layer where a pattern is seen by a user when no image is displayed, for example.

The display panel 200 may be bent with a predetermined radius of curvature. In an embodiment, the radius of curvature of the display panel 200 may be disposed on a plane defined by a straight line in the first direction (x-axis direction) and a straight line in the third direction (z-axis direction), for example. A distance between a straight line passing through an origin of the radius of curvature of the display panel 200 in the second direction (y-axis direction) and the display panel 200 may be the radius of curvature. The display panel 200 may be a flexible display panel that is flexible, and may be easily bent, folded or rolled.

As the display device 10 becomes larger, there may be a difference between the viewing angle when the user views the center area of the display area DA of the display device 10 and the viewing angle when the user views the left and right ends of the display area DA of the display device 10. The viewing angle may be defined by the line of a user's sight and the tangent of the display device 10. By bending the display device 10 along a predetermined curvature, a difference in the viewing angles of the display device 10 may be reduced. In an embodiment, the display device 10 may be curved to be concave toward a user, for example.

The display panel 200 may include a display area DA and a non-display area NDA. The display area DA may include data lines, scan lines, supply voltage lines, and a plurality of pixels SP connected to the respective data lines and scan lines. In an embodiment, the scan lines may be extended in the first direction (x-axis direction) and be spaced apart from one another in the second direction (y-axis direction), for example. The data lines and the supply voltage lines may be extended in the second direction (y-axis direction) and be spaced from one another in the first direction (x-axis direction).

Each of the pixels SP may be connected to at least one scan line, at least one data line, and at least one supply voltage line. Each of the pixels PX may include thin-film transistors including a driving transistor and at least one switching transistor, a light-emitting element, and a capacitor. When a scan signal is applied from a scan line, each of the pixels receives a data voltage from a data line and supplies a driving current to the light-emitting element according to the data voltage applied to the gate electrode, so that light may be emitted.

The non-display area NDA may be disposed at the edge of the display panel 200 to surround the display area DA. The non-display area NDA may include a scan driver (not shown) that applies scan signals to scan lines, and pads (not shown) connected to a circuit board 210.

The display panel 200 may include the circuit board 210 and a display driver 220.

The circuit board 210 may be attached to the pads on the display panel 200 using an anisotropic conductive film ("ACF"). The lead lines of the circuit board 210 may be electrically connected to the pads of the display panel 200. The circuit board 210 may be a flexible printed circuit board ("FPCB"), a printed circuit board ("PCB"), or a flexible film such as a chip-on-film ("COF").

The display driver 220 may be disposed on the circuit board 210. The display driver 220 may output signals and voltages for driving the display panel 200. The display driver 220 may supply data voltages to the data lines. The display driver 220 supplies supply voltage to the supply voltage line, and may supply scan control signals to the scan driver. In an embodiment, the display driver 220 may be disposed (e.g., mounted) on the circuit board 210 and connected to pads of the display panel 200, for example. The display driver 220 may be implemented as an integrated circuit ("IC") and may be disposed in the non-display area NDA of the display panel 200 by a chip on glass ("COG") technique, a chip on plastic ("COP") technique, or an ultrasonic bonding.

The stereoscopic lens 300 may be disposed on the display panel 200. The stereoscopic lens 300 may be attached to a surface of the display panel 200 through an adhesive member. The stereoscopic lens 300 and the display panel 200 may be attached together by a panel bonding apparatus. In an embodiment, the stereoscopic lens 300 may be implemented as a lenticular lens sheet including a plurality of lenses 320, for example. In another embodiment, the stereoscopic lens 300 may be implemented as a liquid-crystal lens that controls the liquid crystals of the liquid-crystal layer to form the lenses, for example. When the stereoscopic lens 300 is implemented as a lenticular lens sheet, the stereoscopic lens 300 may include a base 310 and a plurality of lenses 320.

The base 310 may be disposed directly on the top surface of the display panel 200. In an embodiment, a surface of the base 310 may face the display panel 200, and the opposite surface of the base 310 may face the plurality of lenses 320, for example. The base 310 may be bent with a predetermined radius of curvature. In an embodiment, the stereoscopic lens 300 may be attached to the display panel 200 and then bent with a predetermined radius of curvature, for example. In an alternative embodiment, each of the stereoscopic lens 300 and the display panel 200 may be bent and then attached together by a panel bonding apparatus. In an embodiment, the radius of curvature of the base 310 may be disposed on a plane defined by a straight line in the first direction (x-axis direction) and a straight line in the third direction (z-axis direction). A distance between a straight line passing through an origin of the radius of curvature of the base 310 in the second direction (y-axis direction) and the base 310 may be the radius of curvature.

Light incident from the display panel 200 may pass through the base 310 without change. The direction of light passing through the surface of the base 310 may be coincident with the direction of light passing through the opposite surface of the base 310. The base 310 may be unitary with the plurality of lenses 320, but is not limited thereto.

The plurality of lenses 320 may be disposed on the base 310 to alter the direction of light incident from the display panel 200. Light incident from the display panel 200 may pass through the base 310 to reach the plurality of lenses 320. The plurality of lenses 320 may be inclined from one side of the display panel 200. In an embodiment, the plurality of lenses 320 may be slanted lenses inclined by a predetermined angle from the side of each of the plurality of pixels SP of the display panel 200, for example. The predetermined angle may be designed to prevent the color lines of the display device from being perceived by a viewer.

The plurality of lenses 320 may be unitary with the base 310. In an embodiment, the plurality of lenses 320 may be embossed on the top surface of the base 310, for example. The plurality of lenses 320 may be, but is not limited to, half-cylindrical lenses. In another embodiment, the plurality of lenses 320 may be implemented as Fresnel Lenses, for example. In another embodiment, the plurality of lenses 320 may be fabricated separately from the base 310 and then may be attached to the base 310.

The cover frame 900 may cover the side surfaces and the bottom surface of the display panel 200. The cover frame 900 may form the exterior of the display device 10 on the side surfaces and the bottom surface. In an embodiment, the cover frame 900 may include at least one of plastic and metal, for example.

Figure 4:
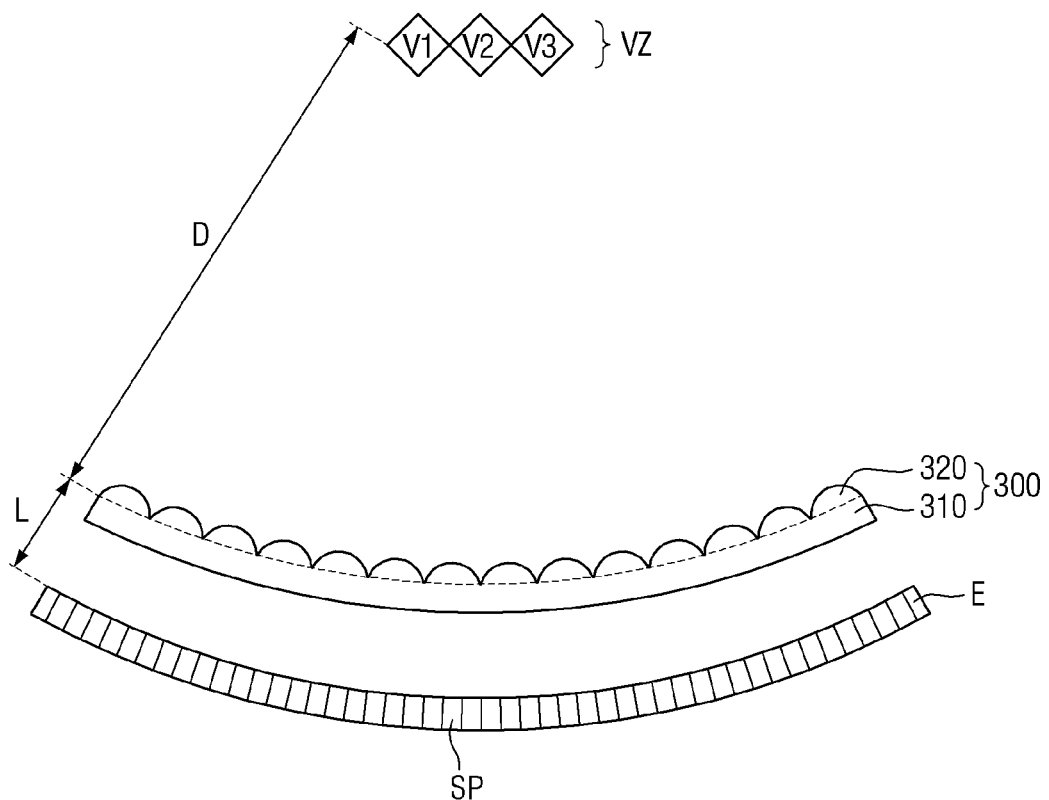
FIG. 4 is a view showing a plurality of video areas provided by a display device.

FIG. 4 is a view showing a plurality of video areas provided by a display device.

Referring to FIG. 4, the display panel 200 may include a light emitting layer E. Each of the pixels SP of the display panel 200 may emit light using the light emitting layer E. Each of the plurality of lenses 320 may be spaced apart from the light emitting layer E of the display panel 200 by a predetermined distance L. In the following description, the distance between each of the plurality of lenses 320 and the light emitting layer E of the display panel 200 is defined as a lens-pixel distance L. In an embodiment, the lens-pixel distance L may be substantially equal to the sum of the thicknesses of the layers of the display panel 200 disposed on the light emitting layer E and the thickness of the base 310 of the stereoscopic lens 300, for example. The display panel 200 may include at least one of a cathode electrode, an encapsulation layer, an encapsulation substrate, and a polarizing film disposed between the light emitting layer E and the base 310.

The display device 10 may adjust the observing distance D or the viewing distance D by adjusting the lens-pixel distance L. The display device 10 may include a plurality of video areas VZ disposed at the optimal observing distance D. In an embodiment, the display device 10 may include first to third video areas V1, V2 and V3, but the number of the video areas VZ is not limited to three, for example. The display device 10 may display a stereoscopic image by displaying different images on a plurality of video areas.

Figure 5:
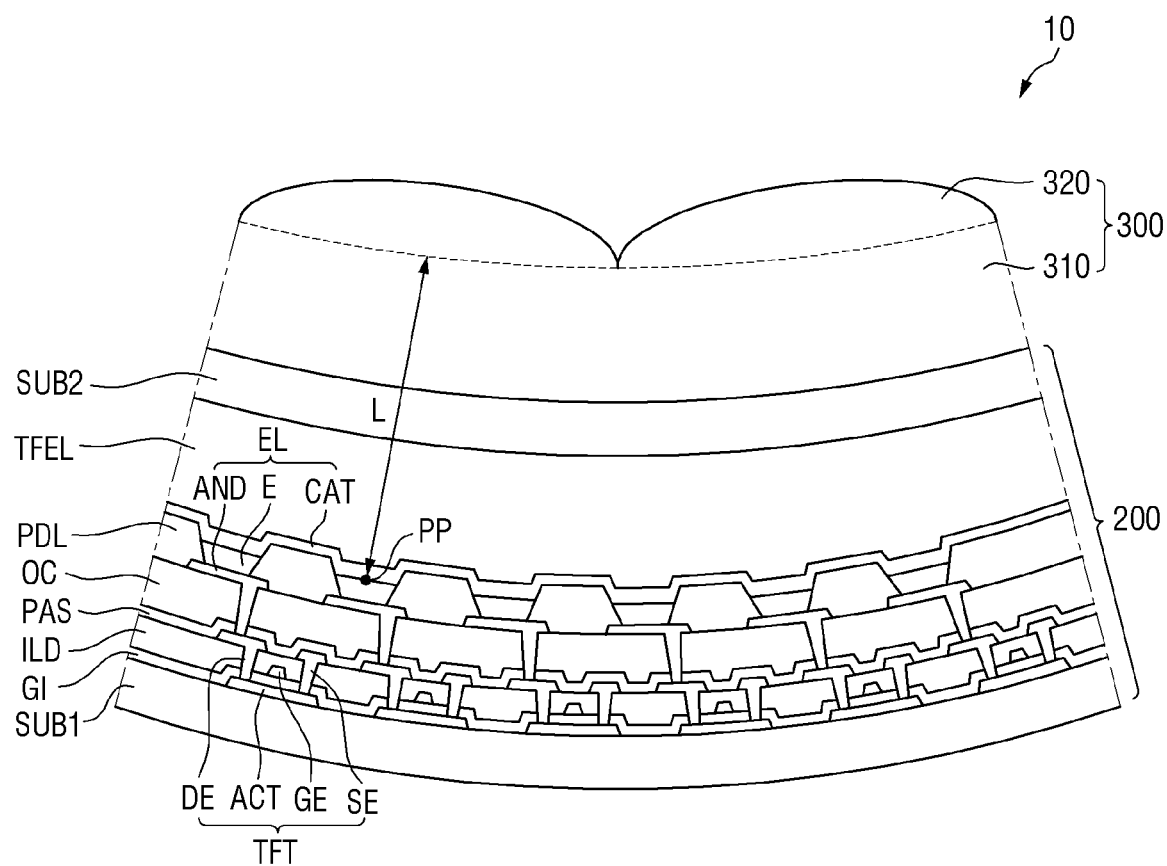
FIG. 5 is a cross-sectional view showing an embodiment of a pixel structure of a display device according to the invention.

FIG. 5 is a cross-sectional view showing an embodiment of a pixel structure of a display device according to the invention.

Referring to FIG. 5, the display panel 200 may include a first substrate SUB1, a plurality of thin-film transistors TFT, a gate insulating layer GI, an interlayer dielectric layer ILD, a passivation layer PAS, and a planarization layer OC, a pixel-defining layer PDL, a plurality of light-emitting elements EL, an encapsulation layer TFEL, and a second substrate SUB2.

The first substrate SUB1 may be a base substrate and may include an insulating material such as a polymer resin. In an embodiment, the first substrate SUB1 may be a flexible substrate that may be bent, folded, or rolled, for example. When the substrate SUB is a flexible substrate, it may include, but is not limited to, polyimide ("PI").

The plurality of thin-film transistors TFT may be disposed on the first substrate SUB1 to form pixel circuits of the plurality of pixels SP. In an embodiment, each of the plurality of thin-film transistors TFT may be a driving transistor or a switching transistor of a pixel circuit, for example. Each of the plurality of thin-film transistors TFT may include a semiconductor layer ACT, a gate electrode GE, a source electrode SE, and a drain electrode DE.

The semiconductor layer ACT may be disposed on the first substrate SUB1. The semiconductor layer ACT may overlap the gate electrode GE, the source electrode SE and the drain electrode DE. The semiconductor layer ACT may be in direct contact with the source electrode SE and the drain electrode DE, and may face the gate electrode GE with the gate insulating layer GI therebetween.

The gate electrode GE may be disposed on the gate insulating layer GI. The gate electrode GE may overlap the semiconductor layer ACT with the gate insulating layer GI interposed therebetween.

The source electrode SE and the drain electrode DE are disposed on the interlayer dielectric layer ILD such that they are spaced apart from each other. The source electrode SE may be in contact with one end of the semiconductor layer ACT through a contact hole defined in the gate insulating layer GI and the interlayer dielectric layer ILD. The drain electrode DE may be in contact with the other end of the semiconductor layer ACT through a contact hole defined in the gate insulating layer GI and the interlayer dielectric layer ILD. The drain electrode DE may be connected to an anode electrode AND of the light-emitting element EL.

The gate insulating layer GI may be disposed on the semiconductor layer ACT. In an embodiment, the gate insulating layer GI may cover the semiconductor layer ACT and the first substrate SUB1, and may insulate the semiconductor layer ACT from the gate electrode GE, for example. A contact hole penetrating through the source electrode SE and a contact hole penetrating through the drain electrode DE may be defined in the gate insulating layer GI.

The interlayer dielectric layer ILD may be disposed over the gate electrode GE. In an embodiment, the interlayer dielectric layer ILD may include the contact hole via which the source electrode SE penetrates and the contact hole via which the drain electrode DE penetrates, for example. The contact hole of the interlayer dielectric layer ILD may be connected to the contact hole of the gate insulating layer GI.

The passivation layer PAS may be disposed on the plurality of thin-film transistors TFT to protect the plurality of thin-film transistors TFT. In an embodiment, a contact hole via which the anode electrode AND of the light-emitting element EL passes may be defined in the passivation layer PAS, for example.

The planarization layer OC may be disposed on the passivation layer PAS to provide a flat surface over the thin-film transistors. In an embodiment, a contact hole via which the anode electrode AND of the light-emitting element EL passes may be defined in the planarization layer OC, for example.

The light-emitting element EL may be disposed on the planarization layer OC. The light-emitting element EL may include an anode electrode AND, a light emitting layer E, and a cathode electrode CAT.

The anode electrode AND may be disposed on the planarization layer OC. In an embodiment, the anode electrode AND may overlap an opening defined by the pixel-defining layer PDL, for example. The anode electrode AND may be connected to the drain electrode DE of the thin-film transistor TFT.

The light emitting layer E may be disposed on the anode electrode AND. The light emitting layer E may include a hole injecting layer, a hole transporting layer, a light-receiving layer, an electron blocking layer, an electron transporting layer, an electron injecting layer, etc. In an embodiment, the light emitting layer E may be, but is not limited to, an organic emissive layer including an organic material, for example. When the light emitting layer E is an organic emissive layer, the thin-film transistor may apply a predetermined voltage to the anode electrode AND of the light-emitting element EL, and the cathode electrode CAT of the light-emitting element EL may receive a common voltage or cathode voltage. In addition, holes and electrons may move to the light-emitting element (e.g., organic emissive layer) E through the hole transporting layer and the electron transporting layer, respectively, and holes and electrons may combine with each other in the light-emitting element (e.g., organic emissive layer) E to emit light.

In the following description, a pixel center PP is defined as the center of the top surface of the light emitting layer E of each of the plurality of pixels SP. In an embodiment, the lens-pixel distance L may be substantially equal to the distance between each of the plurality of lenses 320 and the pixel center PP, for example.

The cathode electrode CAT may be disposed on the light emitting layer E. In an embodiment, the cathode electrode CAT may be implemented as an electrode common to all pixels, instead of being disposed as a separated electrode for each of the pixels, for example. In an embodiment, the cathode electrode CAT may be disposed on the light emitting layer E in the opening and may be disposed on the pixel-defining layer PDL in the area other than the opening, for example.

The pixel-defining layer PDL may define openings. The pixel-defining layer PDL may separate and insulate the anode electrode AND of one of the plurality of light-emitting elements EL from the anode electrode of another one of the plurality of light-emitting elements EL.

The encapsulation layer TFEL may be disposed on the cathode electrode CAT to cover the light-emitting elements EL. The encapsulation layer TFEL may prevent oxygen or moisture from permeating into the light-emitting elements EL.

The second substrate SUB2 is disposed on the encapsulation layer TFEL to protect the display panel 200. In an embodiment, the second substrate SUB2 may be a flexible substrate that may be bent, folded, or rolled, for example.

In an embodiment, the display panel 200 may further include a polarizing film (not shown) disposed on the second substrate SUB2, for example. The polarizing film may be disposed on the second substrate SUB2 to prevent reflection of external light, which otherwise may deteriorate the visibility. The polarizing film may include a retardation film such as a linear polarizer and a λ/4 plate (quarter-wave plate). In an embodiment, the phase retardation film may be disposed on the second substrate SUB2, and the linear polarizer may be disposed between the phase retardation film and the stereoscopic lens 300, for example.

Figure 6:
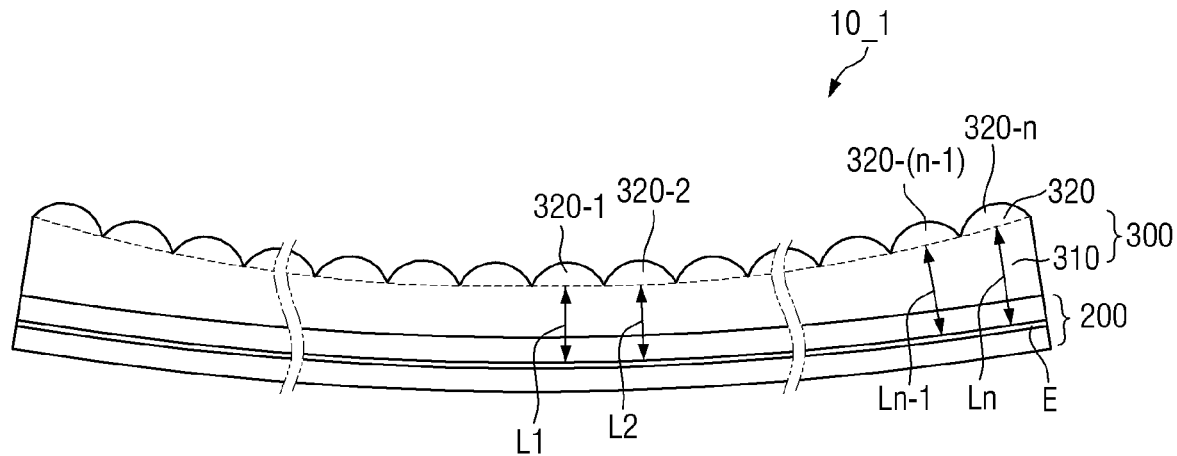
FIG. 6 is a cross-sectional view showing an embodiment of a display device according to the invention.
Figure 7:
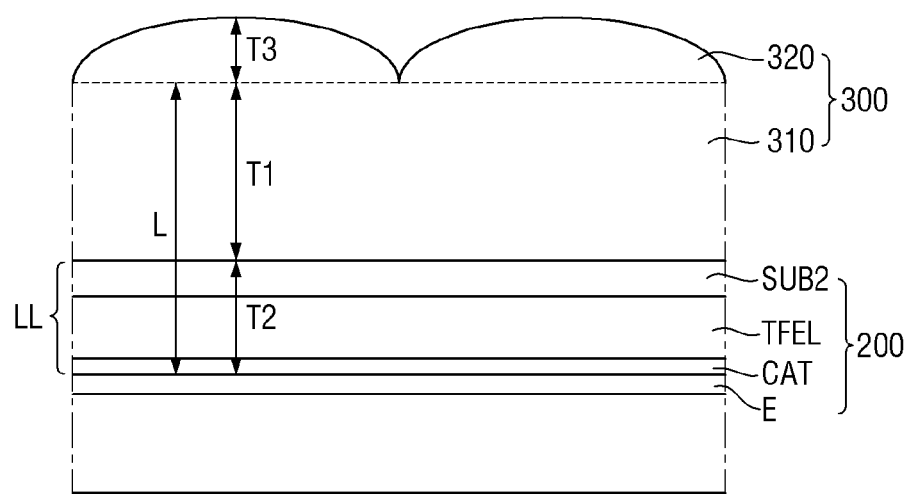
FIG. 7 is a cross-sectional view showing a part of the display device of FIG. 6.

FIG. 6 is a cross-sectional view showing an embodiment of a display device according to the invention. FIG. 7 is a cross-sectional view showing a part of the display device of FIG. 6.

Referring to FIGS. 6 and 7, a display device 10_1 may include a curved display panel 200, and a stereoscopic lens 300 disposed on the display panel 200. The display panel 200 may include a light emitting layer E that emits light by itself. The display panel 200 has a constant thickness and may be bent along the curvature of the stereoscopic lens 300. The stereoscopic lens 300 may be disposed on the display panel 200 and bent with a predetermined radius of curvature.

The thickness T1 of the base 310 of the stereoscopic lens 300 may increase as a distance from the center of the stereoscopic lens 300 increases. In an embodiment, the curved stereoscopic lens 300 may be symmetrical with respect to the center of the stereoscopic lens 300 in the horizontal direction, for example. The thickness of the base 310 may increase or decrease in a direction of the stereoscopic lens 300, and the thickness of the display panel 200 may be uniform. In an embodiment, the lens-pixel distance L may be substantially equal to the sum of the thickness T1 of the base 310 and the thickness T2 of the layers LL disposed on the light emitting layer E of the display panel 200, for example. In the following description, the layers of the display panel 200 disposed on the light emitting layer E are defined as upper panel layers LL. Therefore, the lens-pixel distance L may be substantially equal to the sum of the thickness T1 of the base 310 and the thickness T2 of the upper panel layers LL. Since the thickness of the upper panel layers LL does not change, the lens-pixel distance L may be increased or decreased by the thickness T1 of the base 310.

In an embodiment, the upper panel layers LL may include a cathode electrode CAT, an encapsulation layer TFEL, and a second substrate SUB2, for example. In another embodiment, the upper panel layers LL may further include a polarizing film. Accordingly, the upper panel layers LL may refer to the layers of the display panel 200 disposed on the light emitting layer E, regardless of the configuration of the display panel 200.

The thickness T1 of the base 310 of the stereoscopic lens 300 may be determined based on the refractive index of the base 310, the refractive index between the light emitting layer E and the base 310 or the refractive index of the upper panel layers LL, the distance between the light emitting layer E and the base 310 or the thickness T2 of the upper panel layers LL, the refractive index of the plurality of lenses 320, the thickness T3 of each of the plurality of lenses 320, and the object distance of each of the plurality of lenses 320. In an embodiment, the thickness T1 of the base 310 of the stereoscopic lens 300 may be calculated using Equation 1 below, for example:

$$T1 = n1 \times \left\{ d1 - \left( \frac{T2}{n2} + \frac{T3}{n3} \right) \right\} \qquad \text{[Equation 1]}$$

where T1 denotes the thickness of the base 310 of the stereoscopic lens 300, n1 denotes the refractive index of the base 310, d1 denotes the object distance of each of the lenses 320, T2 denotes the distance between the light emitting layer E and the base 310 or the thickness of the upper panel layers LL, n2 denotes the refractive index between the light emitting layer E and the base 310 or the refractive index of the upper panel layers LL, T3 denotes the thickness of each of the lenses 320, and n3 denotes the refractive index of the lenses 320. Therefore, the display device 10_1 may control the light exit angle of each of the plurality of lenses 320 as the base 310 of the stereoscopic lens 300 have different thicknesses T1. The display device 10_1 may focus light emitted from each of the plurality of lenses 320 to a target observation point, and a viewer may enjoy stereoscopic images on the curved display device.

The distance L between each of the plurality of lenses 320 and the light emitting layer E may increase as a distance from the center of the display panel 200 increases. In an embodiment, the curved display panel 200 may be symmetrical with respect to the center of the display panel 300 in the horizontal direction, for example. The lens-pixel distance L of each of the plurality of lenses 320 may increase as a distance from the center of the display panel 200 or the center of the stereoscopic lens increases. The plurality of lenses 320 may include first to $n^{th}$ lenses 320-1 to 320-$n$ where n is a natural number. The lens-pixel distance Ln of the $n^{th}$ lens 320-$n$ may be larger than the lens-pixel distance Ln−1 of the $(n-1)^{th}$ lens 320-$(n-1)$. The lens-pixel distance L2 of the second lens 320-2 may be larger than the lens-pixel distance L1 of the first lens 320-1. As the lenses 320 of the display device 10_1 have different lens-pixel distance L, the light exit angle of each of the lenses 320 may be controlled. Accordingly, as the display device 10_1 is implemented as a curved display device, the light exit angle of each of the plurality of lenses 320 may be controlled, and the observation points of the plurality of lenses 320 may be matched, thereby displaying a stereoscopic image. The display device 10_1 may focus the observation points of the plurality of lenses 320 on the target observation point, thereby forming the video areas VZ or viewing areas. The display device 10_1 may focus light emitted from each of the plurality of lenses 320 to a target observation point, and a viewer may enjoy stereoscopic images on the curved display device.

The radius of surface curvature of each of the plurality of lenses 320 may increase as a distance from the center of the stereoscopic lens 300 increases. In an embodiment, the curved stereoscopic lens 300 may be symmetrical with respect to the center of the stereoscopic lens 300 in the horizontal direction, for example. The plurality of lenses 320 may include first to $n^{th}$ lenses 320-1 to 320-n. The radius of surface curvature of the $n^{th}$ lens 320-n may be larger than the radius of surface curvature of the $(n-1)^{th}$ lens 320-(n-1). The radius of surface curvature of the second lens 320-2 may be larger than the radius of surface curvature of the first lens 320-1. As the lenses 320 of the display device 10_1 have different radius of curvatures, the light exit angle of each of the lenses 320 may be controlled. Accordingly, as the display device 10_1 is implemented as a curved display device, the light exit angle of each of the plurality of lenses 320 may be controlled, and the observation points of the plurality of lenses 320 may be matched, thereby displaying a stereoscopic image. The display device 10_1 may focus the observation points of the plurality of lenses 320 on the target observation point, thereby forming the video areas VZ or viewing areas. The display device 10_1 may focus light emitted from each of the plurality of lenses 320 to a target observation point, and a viewer may enjoy stereoscopic images on the curved display device.

The thickness T3 of each of the plurality of lenses 320 may decrease as a distance from the center of the stereoscopic lens 300 increases. In an embodiment, the thickness of each of the plurality of lenses 320 may be inversely proportional to the radius of surface curvature thereof, for example. It is, however, to be understood that the invention is not limited thereto. The plurality of lenses 320 may include first to $n^{th}$ lenses 320-1 to 320-n. The thickness T3 of the $n^{th}$ lens 320-n may be smaller than the thickness T3 of the $(n-1)^{th}$ lens 320-(n-1). The thickness T3 of the second lens 320-2 may be smaller than the thickness T3 of the first lens 320-1. As the lenses 320 of the display device 10_1 have different thicknesses T3, the light exit angle of each of the lenses 320 may be controlled. Accordingly, as the display device 10_1 is implemented as a curved display device, the light exit angle of each of the plurality of lenses 320 may be controlled, and the observation points of the plurality of lenses 320 may be matched, thereby displaying a stereoscopic image. The display device 10_1 may focus the observation points of the plurality of lenses 320 on the target observation point, thereby forming the video areas VZ or viewing areas. The display device 10_1 may focus light emitted from each of the plurality of lenses 320 to a target observation point, and a viewer may enjoy stereoscopic images on the curved display device.

The thickness T3 of each of the plurality of lenses 320 may be determined based on the radius of surface curvature and the lens pitch thereof. Herein, the lens pitch may refer to the distance between the lens centers of adjacent lenses. In an embodiment, the thickness T3 of each of the plurality of lenses 320 may be calculated using Equation 2 below, for example:

$$T3 = R1 - \sqrt{R1^2 - \left(\frac{P}{2}\right)^2} \qquad \text{[Equation 2]}$$

where T3 denotes the thickness of each of the plurality of lenses 320, R1 denotes the radius of surface curvature of each of the plurality of lenses 320, and P denotes the lens pitch. Accordingly, as the lenses 320 of the display device 10_1 have different thicknesses T3, the light exit angle of each of the lenses 320 may be controlled. The display device 10_1 may focus light emitted from each of the plurality of lenses 320 to a target observation point, and a viewer may enjoy stereoscopic images on the curved display device.

Figure 8:
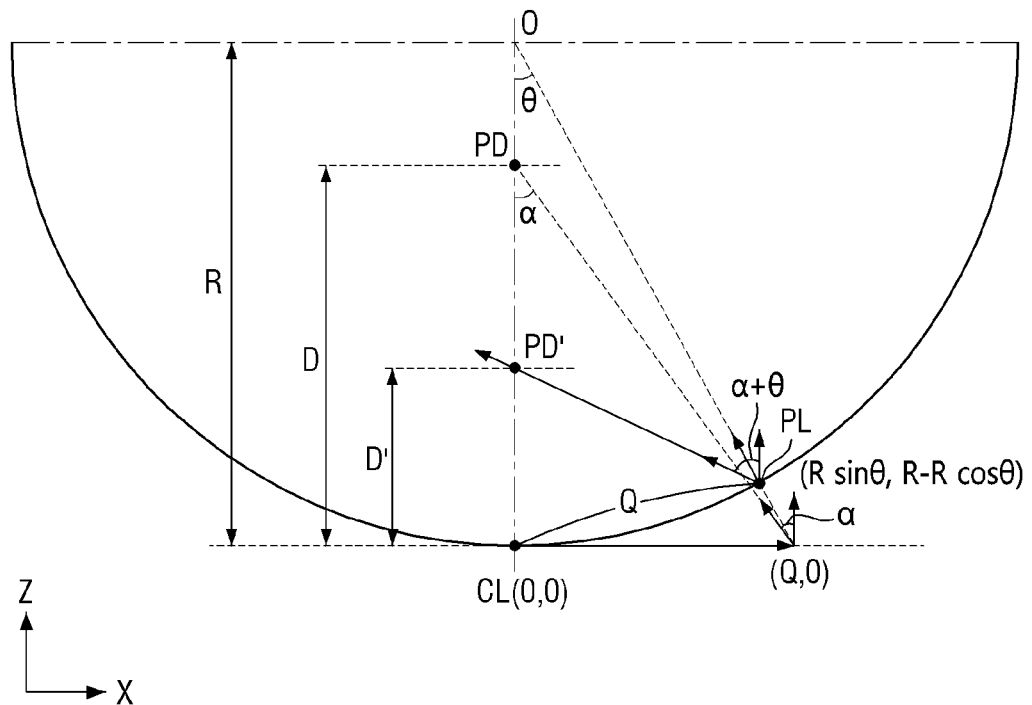
FIG. 8 is a diagram showing an embodiment of a target observation point and an actual observation point by a radius of curvature of a stereoscopic lens in a display device according to the invention.
Figure 9:
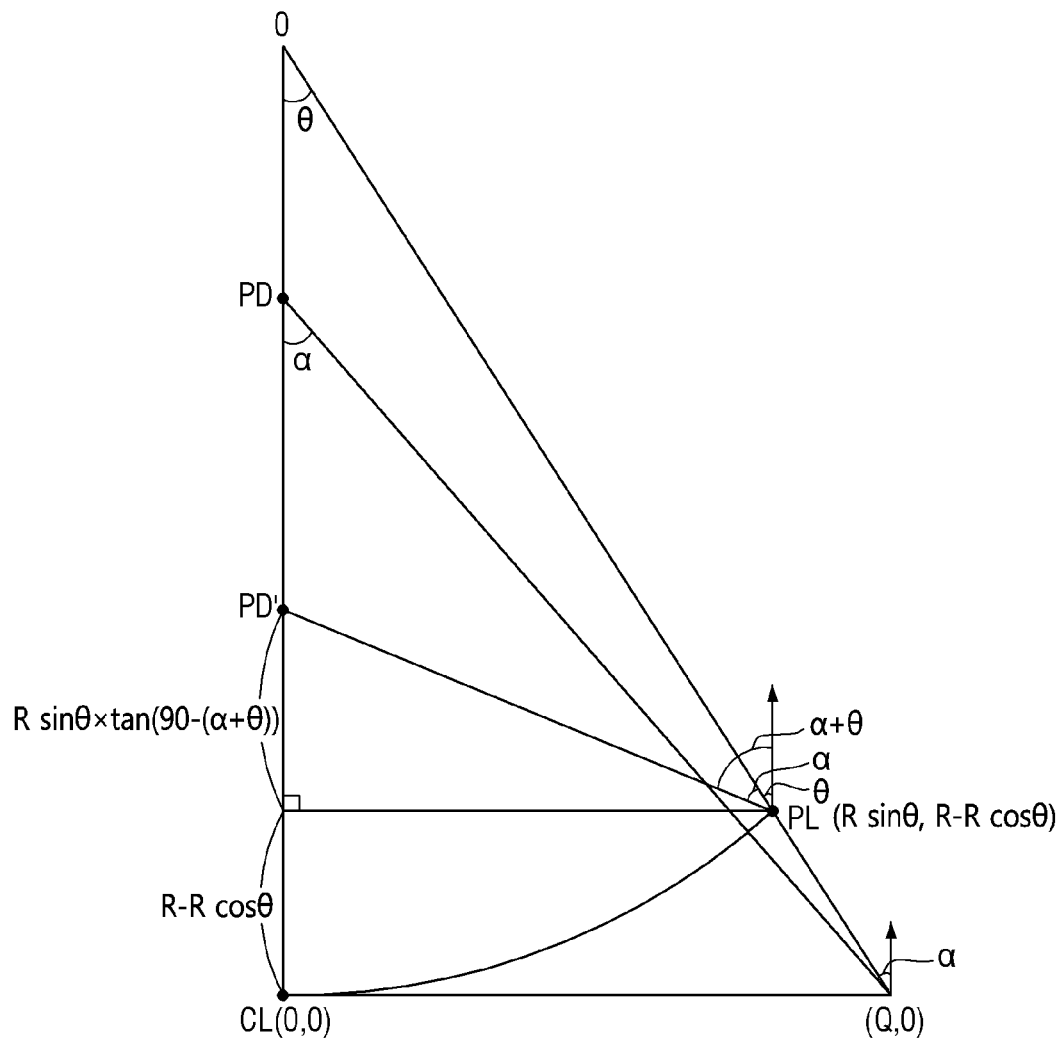
FIG. 9 is a diagram illustrating an embodiment of a process of matching an actual observation point to a target observation point in a display device according to the invention.

FIG. 8 is a diagram showing an embodiment of a target observation point and an actual observation point by a radius of curvature of a stereoscopic lens in a display device according to the invention. FIG. 9 is a diagram illustrating an embodiment of a process of matching an actual observation point to a target observation point in a display device according to the invention. Referring to FIG. 8 in conjunction with FIG. 3, the horizontal direction of the coordinates of FIG. 8 may correspond to the first direction (x-axis direction) of FIG. 3, and the vertical direction of the coordinates of FIG. 8 may correspond to the third direction (z-axis direction) of FIG. 3.

Referring to FIGS. 8 and 9, the stereoscopic lens 300 of the display device 10_1 may be disposed on the display panel 200 and bent with a predetermined radius of curvature R. The top surface of the base 310 of the stereoscopic lens 300 may be disposed along a curve spaced apart from the origin O by the radius of curvature R. In FIG. 8, the lens center of the stereoscopic lens 300 may be disposed at the coordinates (Q, 0) before it is bent. The lens center PL of the stereoscopic lens 300 may be disposed at the coordinates (R×sin θ, R−R×cos θ) after it is bent with the radius of curvature R. The lens center PL on the curved surface may be disposed at a position spaced apart from the origin O at a first angle θ by the radius of curvature R. The distance between the lens center PL of the stereoscopic lens 300 and the lens center CL on the reference line of the stereoscopic lens 300 may be substantially equal to Q. Herein, the reference line may be extended from the origin O in the direction of 0 degree (0=0). The stereoscopic lens 300 may be symmetrical with respect to the reference line in the horizontal direction. Therefore, the lens center CL on the reference line may be disposed at the center of the stereoscopic lens 300.

The lens 320 may emit light in the direction of the second angle α at the coordinates (Q, 0) before the stereoscopic lens 300 is bent. After the stereoscopic lens 300 is bent, the lens center PL of the lens 320 on the curved surface is inclined by the first angle θ, the lens 320 may emit light in the direction of the sum (θ+α) of the first angle θ and the second angle α. The lens 320, which emitted light to the target observation point PD before the stereoscopic lens 300 is bent, may emit light to the actual observation point PD' after the stereoscopic lens 300 is bent. The second angle α that matches the actual observation point PD' after the stereoscopic lens 300 is bent with the target observation point PD may be calculated.

The second angle α may be calculated based on the radius of curvature R of the stereoscopic lens 300, the first angle θ, the second angle α, and the distance P between the lens center CL on the reference line of the stereoscopic lens 300 and the lens center PL of the stereoscopic lens 300. In an embodiment, the second angle α that matches the actual observation point PD' with the target observation point PD may be calculated using Equation 3 below, for example:

$$R\sin\theta \times \tan(90 - (a + \theta)) + (R - R\cos\theta) = \frac{Q}{\tan\alpha} \qquad \text{[Equation 3]}$$

In an embodiment, the left side of Equation 3 may represent the y-axis coordinate value of the actual observation point PD', and the right side of Equation 3 may represent the y-axis coordinate value of the target observation point PD, for example. where R denotes the radius of curvature of the stereoscopic lens 300, θ denotes the first angle or the angle of the straight line between the lens center PL on the curved surface and the origin O, α denotes the second angle or the angle of the straight line between the target observation point PD and the coordinates (Q, 0) of the lens center before it is bent, Q denotes the distance between the lens center CL on the reference line of the stereoscopic lens 300 and the lens center PL of the stereoscopic lens 300 or the x-axis coordinate value of the lens center before it is bent.

In the display device 10_1, the lens-pixel distance L that satisfies the second angle α that matches the actual observation point PD' with the target observation point PD may be calculated. Accordingly, as the lenses 320 of the display device 10_1 have different lens-pixel distance L, the light exit angle of each of the lenses 320 may be controlled. Accordingly, as the display device 10_1 is implemented as a curved display device, the light exit angle of each of the plurality of lenses 320 may be controlled, and the observation points of the plurality of lenses 320 may be matched, thereby displaying a stereoscopic image. The display device 10_1 may focus the observation points PD of the plurality of lenses 320 on the target observation point, thereby forming the video areas VZ or viewing areas. The display device 10_1 may focus light emitted from each of the plurality of lenses 320 to a target observation point PD, and a viewer may enjoy stereoscopic images on the curved display device.

FIG. 10 shows views showing an embodiment of a video area by the outermost lens and a video area by the central lens overlapped each other in a display device according to the invention.

Referring to FIG. 10, the video areas VZ of the plurality of lenses 320 of the display device 10_1 may be overlapped each other. The width of the video area VZ of each of the plurality of lenses 320 may be reduced as a distance from the center CL of the stereoscopic lens 300 increases. The plurality of lenses 320 may include first to $n^{th}$ lenses 320-1 to 320-n. In an embodiment, the length of the video area of the first lens 320-1 (Image of 320-1) on the x-axis may exceed 20 millimeter (mm), but the length of the video area of the $n^{th}$ lens 320-n (Image of 320-n) on the x-axis may be less than 10 mm, for example. The center of the video area of the first lens 320-1 (Image of 320-1) may be adjacent to the center of the video area (Image of 320-n) of the $n^{th}$ lens 320-n. Accordingly, the display device 10_1 may display a stereoscopic image by matching the observation points or the video areas of the plurality of lenses 320 with one another.

Figure 11:
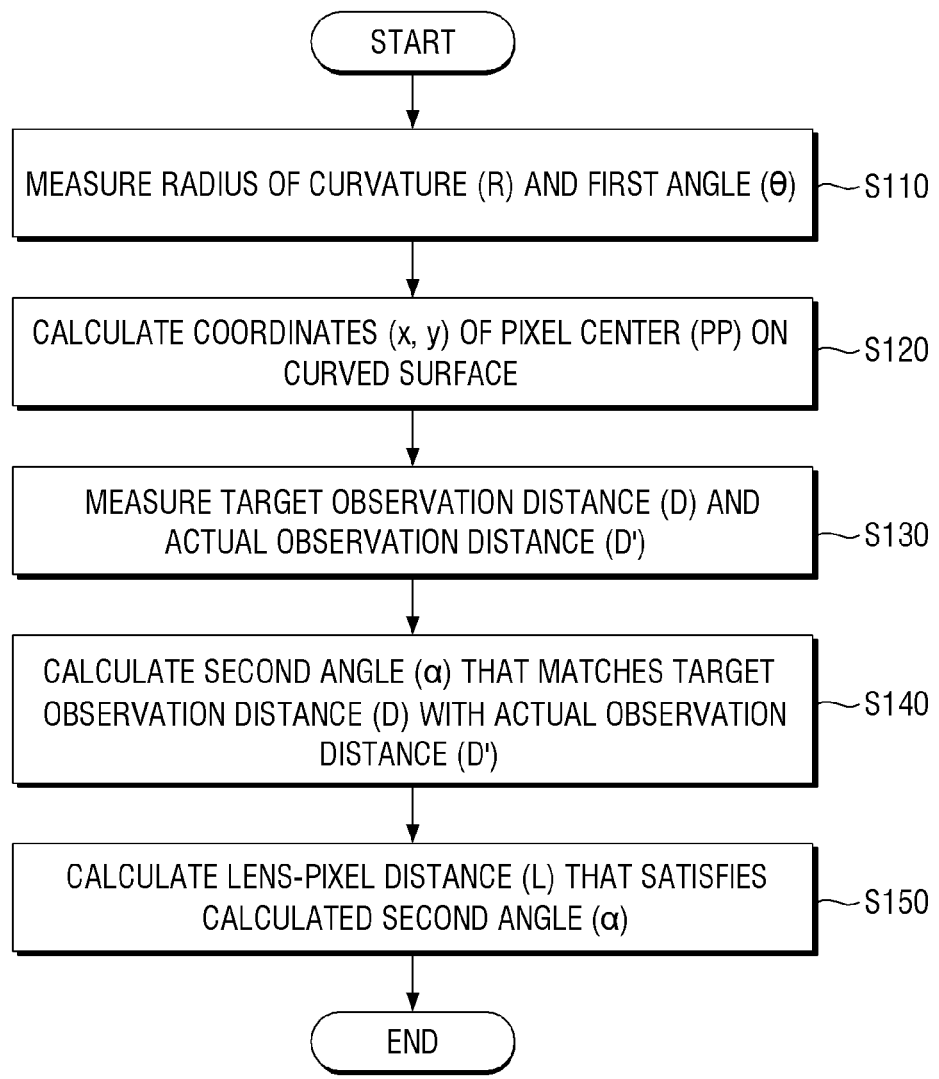
FIG. 11 is a flowchart for illustrating an embodiment of processes for calculating the lens-pixel distance in a display device according to the invention.

FIG. 11 is a flowchart for illustrating an embodiment of processes for calculating the lens-pixel distance in a display device according to the invention.

Referring to FIG. 11, the stereoscopic lens 300 of the display device 10_1 may be disposed on the display panel 200 and bent with a predetermined radius of curvature R. The lens center PL of the stereoscopic lens 300 may be disposed at the coordinates (R×sin θ, R−R×cos θ) after it is bent with the radius of curvature R. The lens center PL may be disposed at a position spaced apart from the origin O by the radius of curvature R at a first angle θ. Accordingly, the radius of curvature R and the first angle θ may be measured based on the distance and angle between the lens center PL and the origin O (operation S110).

The lens center PL of the stereoscopic lens 300 may be measured based on the radius of curvature R and the first angle θ (operation S120). In an embodiment, the lens center PL of the stereoscopic lens 300 may be disposed at the coordinates (R×sin θ, R−R×cos θ) after it is bent with the radius of curvature R, for example.

The lens 320 may emit light in the direction of the second angle α at the coordinates (Q, 0) before the stereoscopic lens 300 is bent. After the stereoscopic lens 300 is bent, the lens center PL of the lens 320 is inclined by the first angle θ, the lens 320 may emit light in the direction of the sum (θ+α) of the first angle θ and the second angle α. The lens 320, which emitted light to the target observation point PD before the stereoscopic lens 300 is bent, may emit light to the actual observation point PD' after the stereoscopic lens 300 is bent. The distance between the target observation point PD and the center CL of the stereoscopic lens 300 may be the target observation distance D, and the distance between the actual observation point PD' and the center CL of the stereoscopic lens 300 may be the actual observation distance D'. Therefore, the target observation distance D and the actual observation distance D' may be calculated using the target observation point PD and the actual observation point PD' (operation S130).

The second angle α that matches the actual observation point PD' with the target observation point PD may be calculated using Equation 3 (operation S140). In an embodiment, the left side of Equation 3 may correspond to the y-axis coordinate value of the actual observation point PD', and the right side of Equation 3 may correspond to the y-axis coordinate value of the target observation point PD, for example.

In the display device 10_1, the lens-pixel distance L that satisfies the second angle α that matches the actual observation point PD' with the target observation point PD may be calculated (operation S150). Accordingly, as the lenses 320 of the display device 10_1 have different lens-pixel distance L, the light exit angle of each of the lenses 320 may be controlled. Accordingly, as the display device 10_1 is implemented as a curved display device, the light exit angle of each of the plurality of lenses 320 may be controlled, and the observation points of the plurality of lenses 320 may be matched, thereby displaying a stereoscopic image.

Figure 12:
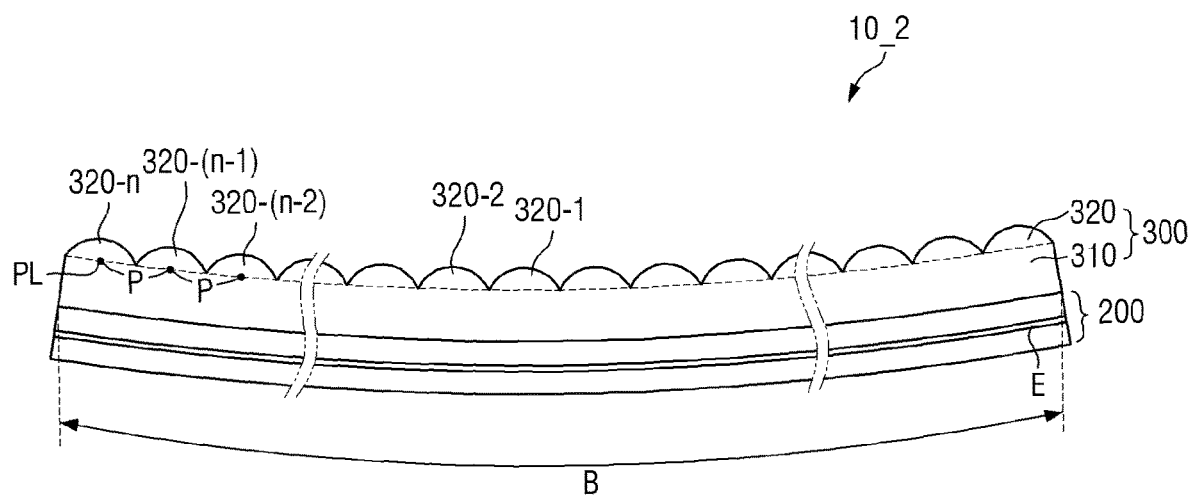
FIG. 12 is a cross-sectional view showing another embodiment of a display device according to the invention.

FIG. 12 is a cross-sectional view showing another embodiment of a display device according to the invention.

Referring to FIG. 12, a display device 10_2 may include a curved display panel 200 bent with a predetermined radius of curvature R, and a stereoscopic lens 300 disposed on the display panel 200. The display panel 200 may include a light emitting layer E that emits light by itself. The display panel 200 has a constant thickness and may be bent with a predetermined radius of curvature R. The stereoscopic lens 300 may be disposed on the display panel 200 and bent along the curvature of the display panel 200.

The pitches P of the stereoscopic lens 300 may be all substantially equal. In an embodiment, each of the lens pitches P may be substantially equal to the distance between the lens centers of the adjacent lenses 320, for example. The plurality of lenses 320 may include first to $n^{th}$ lenses 320-1 to 320-n. The lens pitch P between the $n^{th}$ lens 320-n and the $(n-1)^{th}$ lens 320-(n-1) may be substantially equal to the lens pitch P between the $(n-1)^{th}$ lens 320-(n-1) and the $(n-2)^{th}$ lens 320-(n-2). The lens pitch P between the third lens 320-3 and the second lens 320-2 may be substantially equal to the lens pitch P between the second lens 320-2 and the first lens 320-1. Therefore, the display device 10_2 may have the extended line passing through the outermost lens center PL (refer to FIGS. 13A and 13B) and the pixel center PP (refer to FIGS. 13A and 13B) of the display panel 200 corresponding to the outermost lens center PL reach the target observation point PD (refer to FIGS. 14 and 15). The display device 10_2 may have the extended line passing through the lens center of each of the plurality of lenses 320 and the pixel center of the display panel 200 corresponding to the lens center reach the target observation point PD.

As the display device 10_2 is implemented as a curved display device, the observation points of the plurality of lenses 320 may be matched, thereby displaying a stereoscopic image. The display device 10_2 may focus the observation points PD of the plurality of lenses 320 on the target observation point, thereby forming the video areas VZ or viewing areas. The display device 10_2 may focus light emitted from each of the plurality of lenses 320 to a target observation point PD, and a viewer may enjoy stereoscopic images on the curved display device.

The lenses 320 may have the same radius of surface curvature. The lens centers of the lenses 320 may be disposed on a curve having a predetermined radius of curvature. The lens centers of the lenses 320 may be disposed on the upper surface of the curved base 310. The lenses 320 may have the same thickness, and the thickness of the base 310 of the stereoscopic lens 300 may be uniform.

Figure 13A:
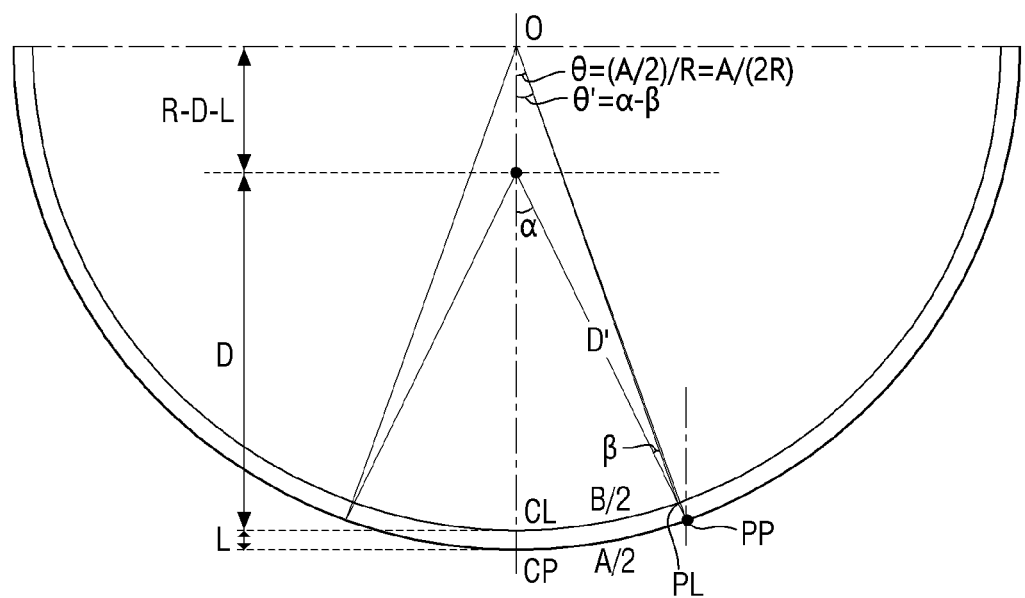
FIG. 13A is a diagram showing another embodiment of an arrangement of a target observation point, a lens center, and a pixel center in a display device.
Figure 13B:
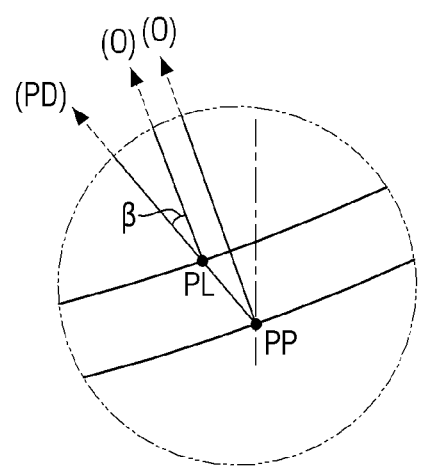
FIG. 13B is an enlarged view of a part of the display device of FIG. 13A.
Figure 14:
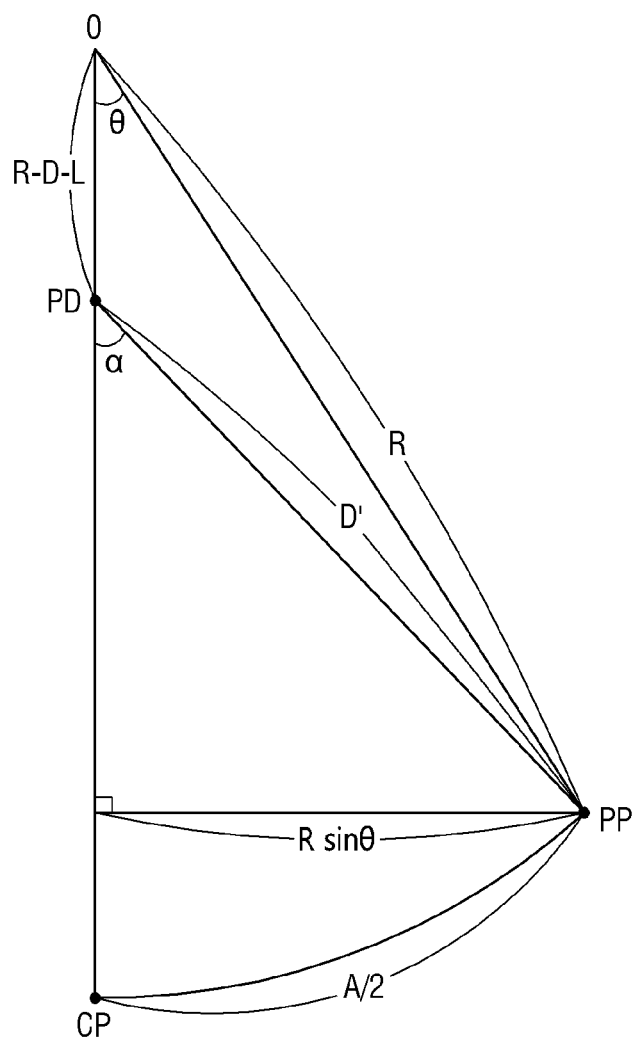
FIG. 14 is a diagram showing another embodiment of a distance between a central pixel center and an outermost pixel center in a display device.
Figure 15:
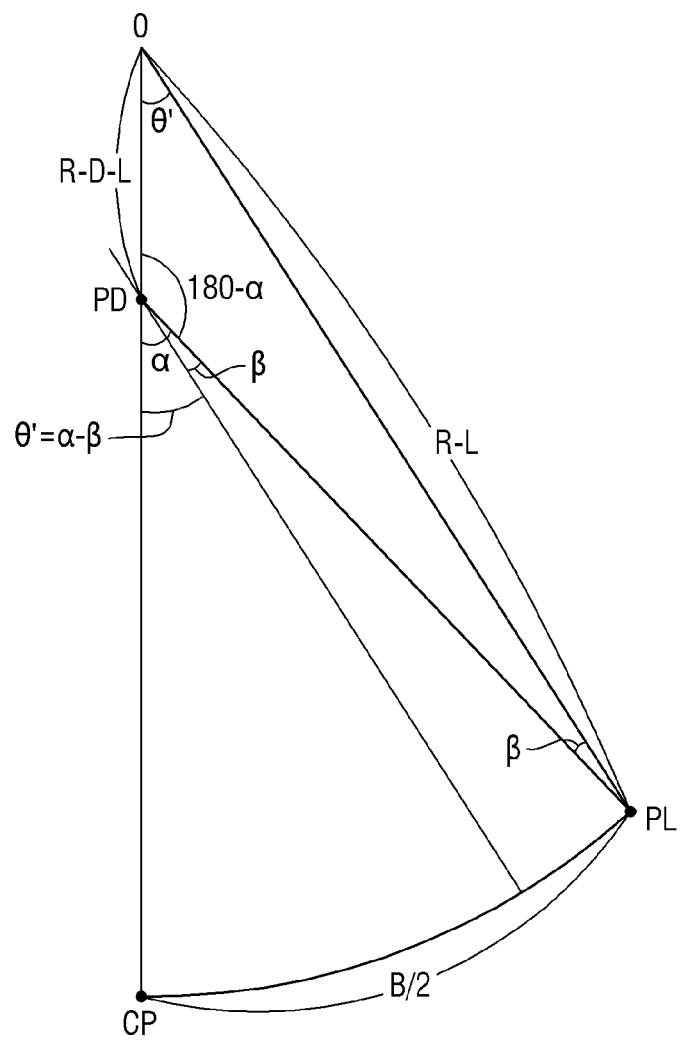
FIG. 15 is a diagram showing another embodiment of a distance between a central lens center and an outermost lens center in a display device.

FIG. 13A is a diagram showing another embodiment of an arrangement of a target observation point, a lens center, and a pixel center in a display device, and FIG. 13B is an enlarged view of a part of the display device of FIG. 13A. FIG. 14 is a diagram showing another embodiment of a distance between a central pixel center and an outermost pixel center in a display device. FIG. 15 is a diagram showing another embodiment of a distance between a central lens center and an outermost lens center in a display device.

Referring to FIGS. 13A to 15, a display device 10_2 may include a curved display panel 200 bent with a predetermined radius of curvature R, and a stereoscopic lens 300 disposed on the display panel 200. The display panel 200 may include a light emitting layer E that emits light by itself. The display panel 200 has a constant thickness and may be bent with a predetermined radius of curvature R. The stereoscopic lens 300 may be disposed on the display panel 200 and bent along the curvature of the display panel 200.

The lens pitches P may be determined based on a length B of the lens area of the stereoscopic lens 300 and the number of the plurality of lenses 320. In an embodiment, the length B of the lens area of the stereoscopic lens 300 may be defined as the length of a curve from the outermost lens center PL adjacent to one edge of the stereoscopic lens 300 to the outermost edge adjacent to the other edge of the stereoscopic lens 300, for example. In an alternative embodiment, the length B of the lens area of the stereoscopic lens 300 may be substantially equal to twice the length between the outermost lens center PL adjacent to one edge of the stereoscopic lens 300 and the lens center CL on the reference line (B/2=CL~PL).

In the display device 10_2, a second angle α may be calculated based on a curvature radius R of the display panel 200, a first angle θ, and a distance D' between the target observation point PD and the pixel center PP of the display panel 200. In an embodiment, the second angle α may be calculated using Equation 4 below, for example:

$$\alpha = \sin^{-1}\left(\frac{R\sin\theta}{D'}\right) \qquad \text{[Equation 4]}$$

where α denotes the second angle or the angle between the straight line passing through the target observation point PD and the outermost lens center PL and the reference line passing through the origin O, R denotes the radius of curvature of the display panel 200, θ denotes the first angle or the angle between the straight line passing through the origin O and the pixel center PP of the display panel 300 corresponding to the outermost lens center PL and reference line passing through the origin O, and D' denotes the distance between the target observation point PD and the pixel center PP of the display panel 200.

In the display device 10_2, a third angle β may be calculated based on the radius of curvature R of the display panel 200, the lens-pixel distance L, the distance D between the target observation point PD and the lens center CL on the reference line, and the second angle α. In an embodiment, the third angle β may be calculated using Equation 5 below, for example:

$$\frac{R-L}{\sin(180-\alpha)} = \frac{R-D-L}{\sin(\beta)} \qquad \text{[Equation 5]}$$

where R denotes the radius of curvature of the display panel 200, L denotes the lens-pixel distance, D denotes the distance between the target observation point PD and the lens center CL on the reference line, α denotes the second angle or the angle between the straight line passing through the target observation point PD and the outermost lens center PL and the reference line passing through the origin O, and β denotes the third angle or the angle between the straight line passing through the origin O of the radius of curvature R and the outermost lens center PL and the straight line passing through the target observation point PD and the outermost lens center PL.

In the display device 10_2, the fourth angle θ' may be calculated using the calculated second angle α and third angle β (θ'=α−β).

In the display device 10_2, the length B of the lens area of the stereoscopic lens 300 may be calculated based on the distance R-L between the origin O of the radius of curvature R of the display panel 200 and the outermost lens center PL, and the fourth angle θ'. In an embodiment, the length B of the lens area of the stereoscopic lens 300 may be calculated using Equation 6 below, for example:

$$B=2(R-L)\theta' \qquad \text{[Equation 6]}$$

where B denotes the length of the lens area, R−L denotes the distance between the origin O of the radius of curvature R of the display panel 200 and the outermost lens center PL, θ' denotes the fourth angle or the angle made by the straight line (O~PL) between the origin O of the radius of curvature R of the display panel 200 and the outermost lens center PL and the reference line (O~CL) passing through the origin O of the radius of curvature R of the display panel 200 and the lens center CL.

In the display device 10_2, a plurality of lens pitches P may be calculated by dividing the length B of the lens area by the number of the plurality of lenses 320. As the lens pitches P are all substantially equal, the display device 10_2 may have the extended line passing through the lens center PL of each of the lenses 320 and the pixel center PP of the display panel 200 corresponding to the lens center PL reach the target observation point PD. Accordingly, as the display device 10_2 is implemented as a curved display device, the observation points of the plurality of lenses 320 may be matched, thereby displaying a stereoscopic image. The display device 10_2 may focus the observation points PD of the plurality of lenses 320 on the target observation point, thereby forming the video areas VZ or viewing areas. The display device 10_2 may focus light emitted from each of the plurality of lenses 320 to a target observation point PD, and a viewer may enjoy stereoscopic images on the curved display device.

Figure 16:
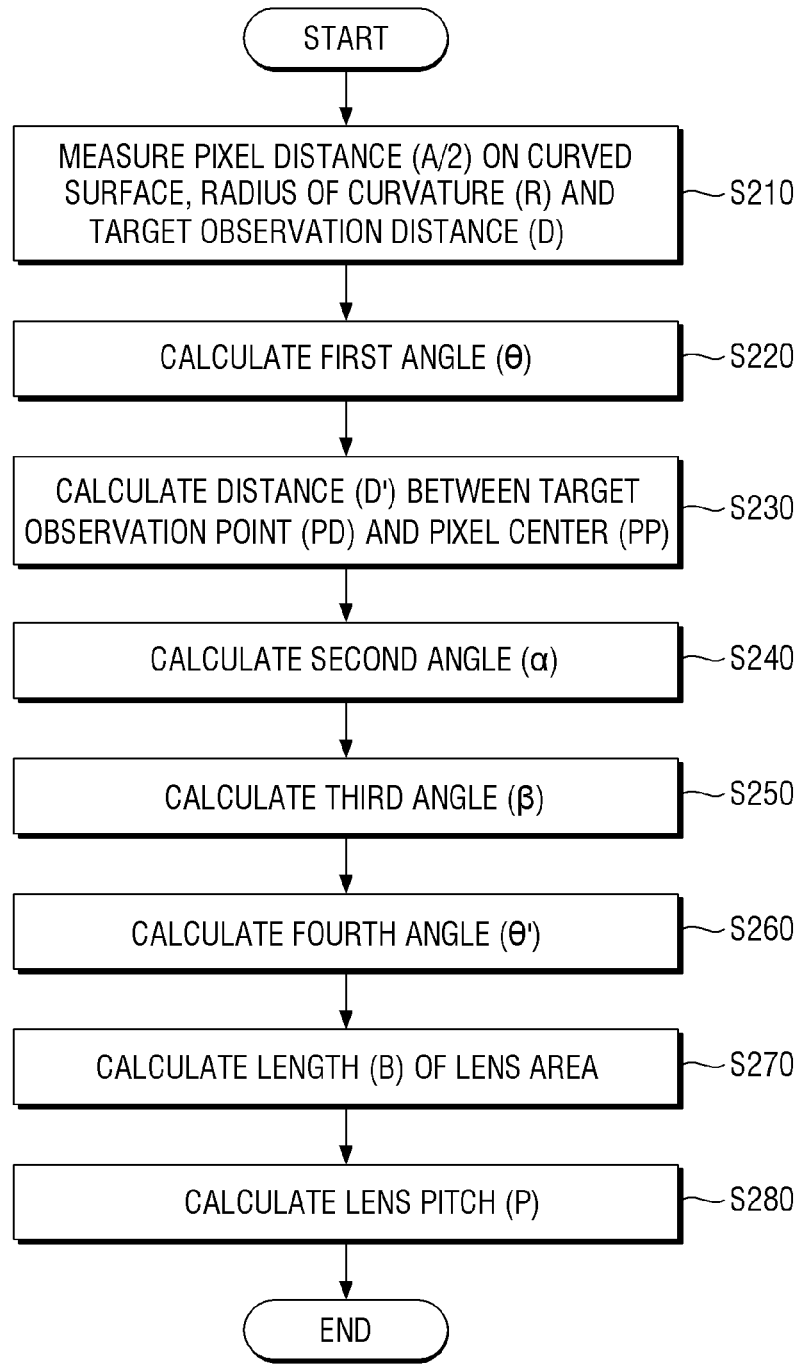
FIG. 16 is a flowchart for illustrating another embodiment of processes for calculating a lens pitch in a display device according to the invention.

FIG. 16 is a flowchart for illustrating another embodiment of processes for calculating a lens pitch in a display device according to the invention.

Referring to FIG. 16, a pixel distance A/2 on a curved surface, a radius of curvature R of the display panel 200, and a target observation distance D may be measured (operation S210). The pixel distance A/2 on the curved surface may be defined as the distance on the curved surface between the center CP of the display panel 200 and the pixel center PP corresponding to the outermost lens center CL. The target observation distance D may be defined as distance between the target observation point PD and the center CL of the stereoscopic lens 300.

The first angle θ may be calculated using the pixel distance A/2 on the curved surface and the radius of curvature R of the display panel 200 (R×θ=A/2) (operation S220).

The distance D' between the target observation point PD and the pixel center PP of the display panel 200 may be calculated (operation S230).

As expressed in Equation 4 above, the second angle α may be calculated based on a radius of curvature R of the display panel 200, a first angle θ, and a distance D' between the target observation point PD and the pixel center PP of the display panel 200 (operation S240).

As expressed in Equation 5 above, the third angle β may be calculated using the radius of curvature R of the display panel 200, the lens-pixel distance L, the distance D between the target observation point PD and the lens center CL on the reference line, and the second angle α (operation S250).

The fourth angle θ' may be calculated using the second angle α and the third angle β (operation S260).

As expressed in Equation 6 above, the length B of the lens area may be calculated using the distance R-L between the origin O of the radius of curvature R of the display panel 200 and the outermost lens center PL, and the fourth angle θ' (operation S270).

In the display device 10_2, a plurality of lens pitches P may be calculated by dividing the length B of the lens area by the number of the plurality of lenses 320 (operation S280). As the lens pitches P are all substantially equal, the display device 10_2 may have the extended line passing through the lens center PL of each of the lenses 320 and the pixel center PP of the display panel 200 corresponding to the lens center PL reach the target observation point PD.

Figure 17:
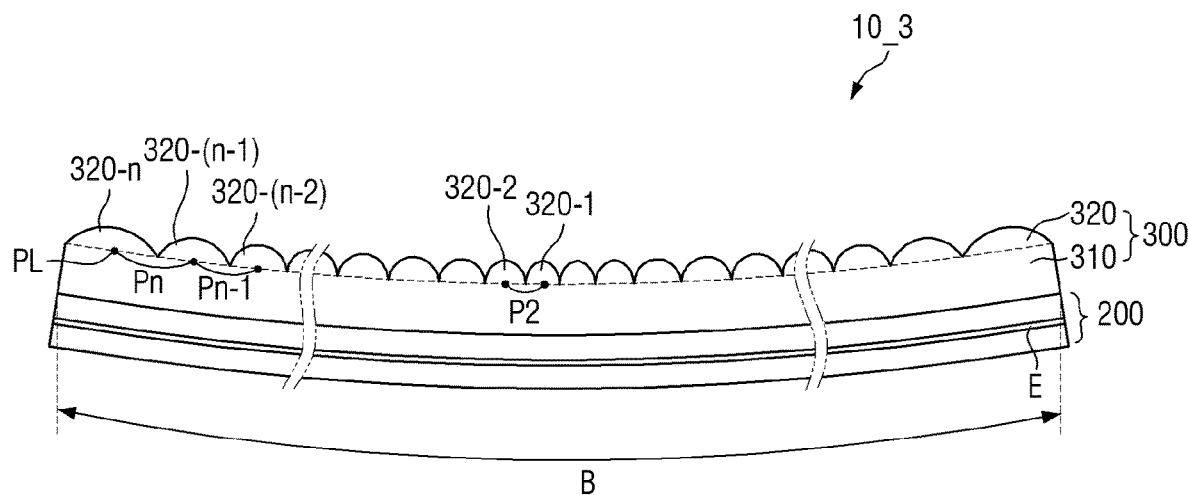
FIG. 17 is a cross-sectional view showing another embodiment of a display device according to another embodiment of the invention.
Figure 18:
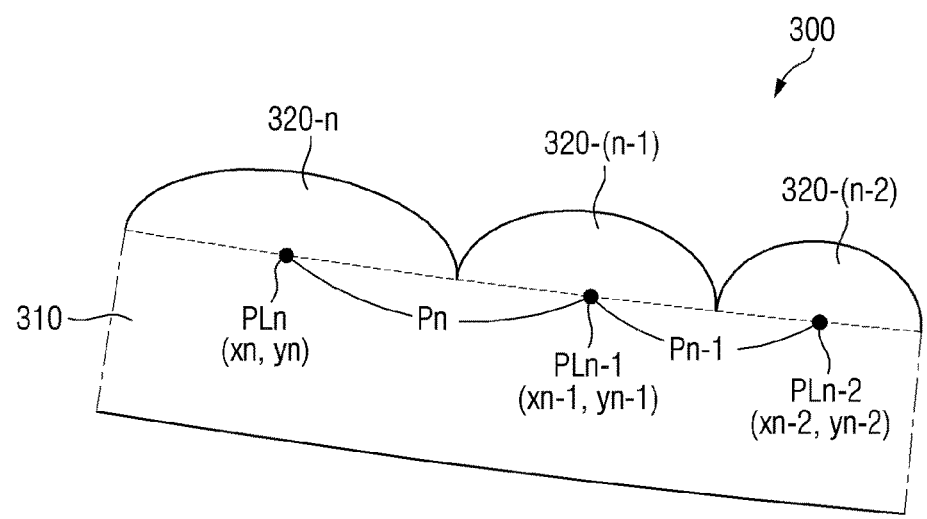
FIG. 18 is a cross-sectional view showing the stereoscopic lens of FIG. 17.

FIG. 17 is a cross-sectional view showing another embodiment of a display device according to the invention. FIG. 18 is a cross-sectional view showing the stereoscopic lens of FIG. 17.

Referring to FIGS. 17 and 18, a display device 10_3 may include a curved display panel 200 bent with a predetermined radius of curvature R, and a stereoscopic lens 300 disposed on the display panel 200. The display panel 200 may include a light emitting layer E that emits light by itself. The display panel 200 has a constant thickness and may be bent with a predetermined radius of curvature R. The stereoscopic lens 300 may be disposed on the display panel 200 and bent along the curvature of the display panel 200.

The plurality of lens pitches P of the stereoscopic lens 300 may increase as the lens centers PL are farther from the center of the stereoscopic lens 300. In an embodiment, each of the lens pitches P may be substantially equal to the distance between the lens centers of the adjacent lenses 320, for example. The plurality of lenses 320 may include first to $n^{th}$ lenses 320-1 to 320-$n$. In an embodiment, the plurality of lens pitches P may include a lens pitch P2 between the first lens 320-1 and the second lens 320-2 to a lens pitch Pn between the $n^{th}$ lens 320-$n$ and the $(n-1)^{th}$ lens 320-$(n-1)$. The $n^{th}$ lens pitch Pn between the $n^{th}$ lens 320-$n$ and the $(n-1)^{th}$ lens 320-$(n-1)$ may be larger than the $(n-1)^{th}$ lens pitch Pn-1 between the $(n-1)^{th}$ lens 320-$(n-1)$ and the $(n-2)^{th}$ lens 320-$(n-2)$. In an embodiment, the $n^{th}$ lens pitch Pn may be substantially equal to the distance between the lens center PLn of the $n^{th}$ lens 320-$n$ and the lens center PLn-1 of the $(n-1)^{th}$ lens 320-$(n-1)$, for example. The $(n-1)^{th}$ lens pitch Pn-1 may be substantially equal to the distance between the lens center PLn-1 of the $(n-1)^{th}$ lens 320-$(n-1)$ and the lens center PL(n-2) of the $(n-2)^{th}$ lens 320-$(n-2)$. Therefore, the display device 10_3 may have the extended line passing through the lens center PL of each of the plurality of lenses 320 and the pixel center PP of the display panel 200 corresponding to the lens center PL reach the target observation point PD.

As the display device 10_3 is implemented as a curved display device, the observation points of the plurality of lenses 320 may be matched, thereby displaying a stereoscopic image. The display device 10_3 may focus the observation points PD of the plurality of lenses 320 on the target observation point, thereby forming the video areas VZ or viewing areas. The display device 10_1 may focus light emitted from each of the plurality of lenses 320 to a target observation point PD, and a viewer may enjoy stereoscopic images on the curved display device.

Figure 19:
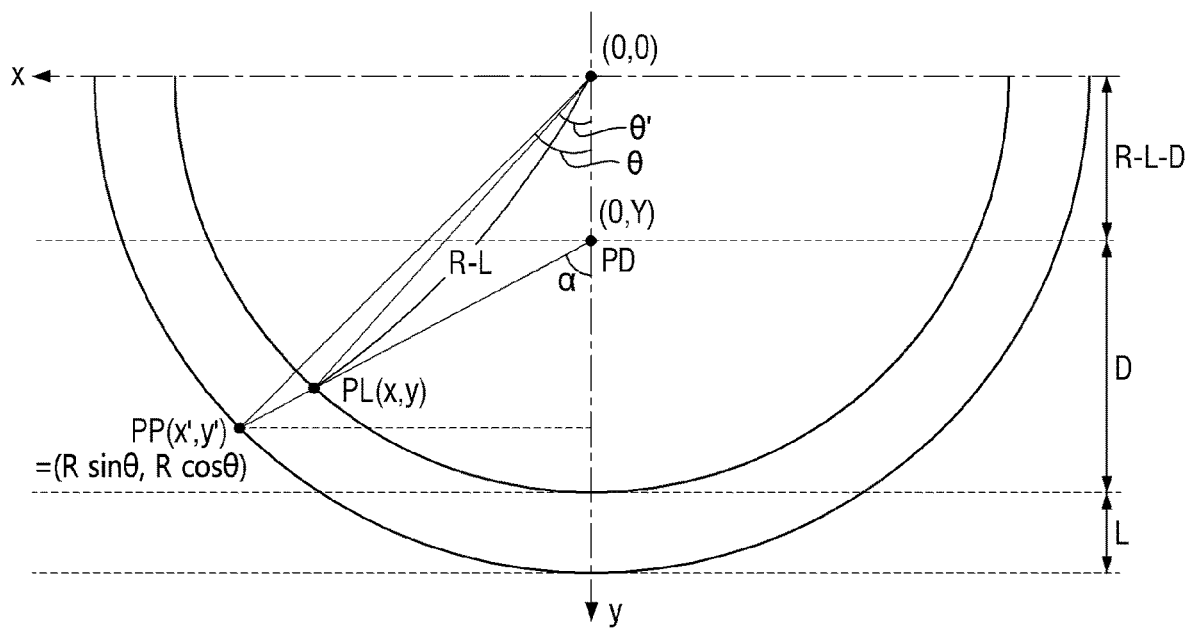
FIG. 19 is a diagram showing another embodiment of an arrangement of a target observation point, a lens center, and a pixel center in a display device.
Figure 20:
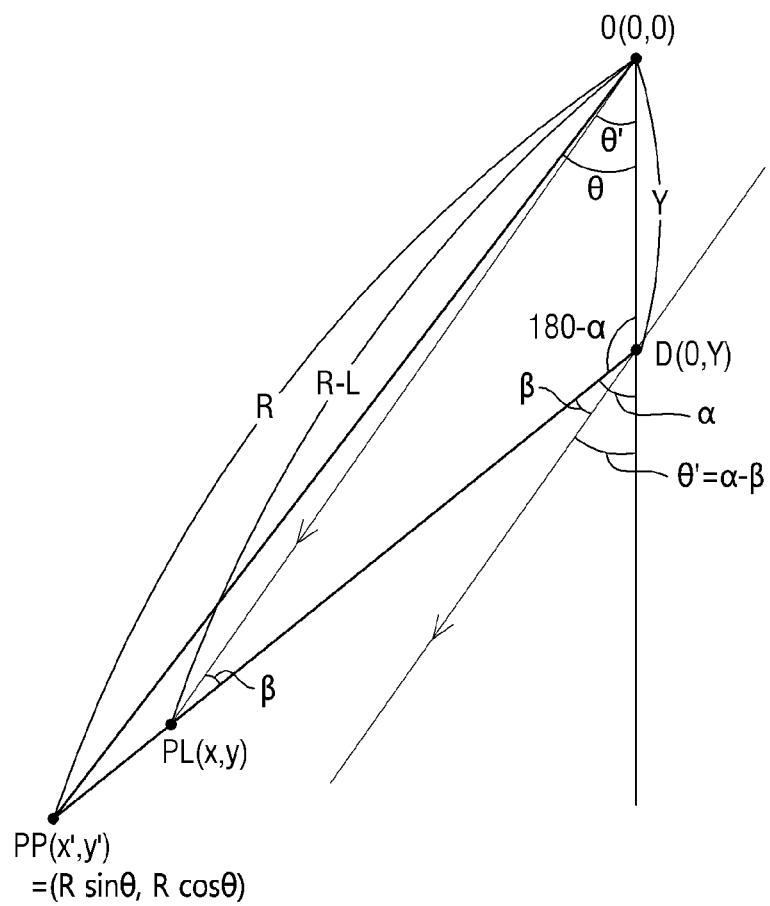
FIG. 20 is a flowchart for illustrating another embodiment of processes for calculating coordinates of a lens center in a display device according to the invention.

FIG. 19 is a diagram showing another embodiment of an arrangement of a target observation point, a lens center, and a pixel center in a display device. FIG. 20 is a flowchart for illustrating another embodiment of processes for calculating coordinates of a lens center in a display device. Referring to FIG. 19 in conjunction with FIG. 3, the x-axis of the coordinates of FIG. 19 may be opposite to the first direction (x-axis direction) of FIG. 3, and the y-axis of the coordinates of FIG. 19 may be opposite to the third direction (z-axis direction) of FIG. 3.

Referring to FIGS. 19 and 20, a display device 10_3 may include a curved display panel 200 bent with a predetermined radius of curvature R, and a stereoscopic lens 300 disposed on the display panel 200. The display panel 200 may include a light emitting layer E that emits light by itself. The display panel 200 has a constant thickness and may be bent with a predetermined radius of curvature R. The stereoscopic lens 300 may be disposed on the display panel 200 and bent along the curvature of the display panel 200.

The first angle θ may be calculated using the radius of curvature R of the display panel 200 and the pixel distance A/2 on the curved surface (R×θ=A/2). The first angle θ may be the slope of the straight line between the pixel center PP and the origin O of the radius of curvature R. The pixel distance A/2 on the curved surface may be defined as the distance on the curved surface between the center CP of the display panel 200 and the pixel center PP on the curved surface.

The coordinates (x', y') of the pixel center PP may be calculated using the radius of curvature R and the first angle θ (x', y'=R×sin θ, R×cos θ).

In the display device 10_3, the second angle α may be calculated based on the x-axis coordinate (x') of the pixel center PP, the y-axis coordinate (y') of the pixel center PP, and the distance Y between the origin O and the target observation point PD. The second angle α may be defined as an angle between a straight line between the target observation point PD and the pixel center PP and the reference line passing through the origin O. In an embodiment, the second angle α may be calculated using Equation 7 below, for example:

$$\alpha = \tan^{-1}\frac{x'}{y' - Y} \quad \text{[Equation 7]}$$

where α denotes a second angle or an angle between a straight line passing through the target observation point PD and the pixel center PP and a reference line passing through the origin O, x' denotes the x-axis coordinate of the pixel center PP, y' denotes the y-axis coordinate of the pixel center PP, Y denotes the distance between the origin O and the target observation point PD.

In the display device 10_3, a third angle β may be calculated based on the second angle α, the radius of curvature R of the display panel 200, the lens-pixel distance L, the distance Y between the origin O and the target observation point PD. In an embodiment, the third angle β may be calculated using Equation 8 below, for example:

$$\beta = \sin^{-1}\left(\frac{\sin(180 - \alpha)}{R - L} \times Y\right) \quad \text{[Equation 8]}$$

where β denotes the third angle or the angle between the straight line passing through the origin O of the radius of curvature R and the lens center PL of each of the lenses 320 and the straight line passing through the target observation point PD and the lens center PL, α denotes the second angle, R denotes the radius of curvature, L denotes the lens-pixel distance, and Y denotes the distance between the origin O and the target observation point PD.

In an embodiment, in the display device 10_3, the fourth angle θ' may be calculated using the calculated second angle α and third angle β (θ'=α−β), for example.

In another embodiment, in the display device 10_3, the fourth angle θ' may be calculated based on the second angle α, the radius of curvature R of the display panel 200, the lens-pixel distance L, the distance Y between the origin O and the target observation point PD, for example. The fourth angle θ' may be calculated using Equation 9 below:

$$\theta' = \alpha - \sin^{-1}\left(\frac{\sin(180 - \alpha)}{R - L} \times Y\right) \quad \text{[Equation 9]}$$

where θ' denotes the fourth angle or the angle between the straight line passing through the lens center PL of each of the lenses 320 and the origin O of the radius of curvature R and the straight line passing through the origin O of the radius of curvature R, α denotes the second angle, R denotes the radius of curvature, L denotes the lens-pixel distance, and Y denotes the distance between the origin O and the target observation point PD.

As the lens pitches P are different from one another, the display device 10_3 may have the extended line passing through the lens center PL of each of the lenses 320 and the pixel center PP of the display panel 200 corresponding to the lens center PL reach the target observation point PD. Accordingly, as the display device 10_3 is implemented as a curved display device, the observation points of the plurality of lenses 320 may be matched, thereby displaying a stereoscopic image. The display device 10_3 may focus the observation points PD of the plurality of lenses 320 on the target observation point, thereby forming the video areas VZ or viewing areas. The display device 10_3 may focus light sent from each of the plurality of lenses 320 to a target observation point PD, and a viewer may enjoy stereoscopic images on the curved display device.

Figure 21:
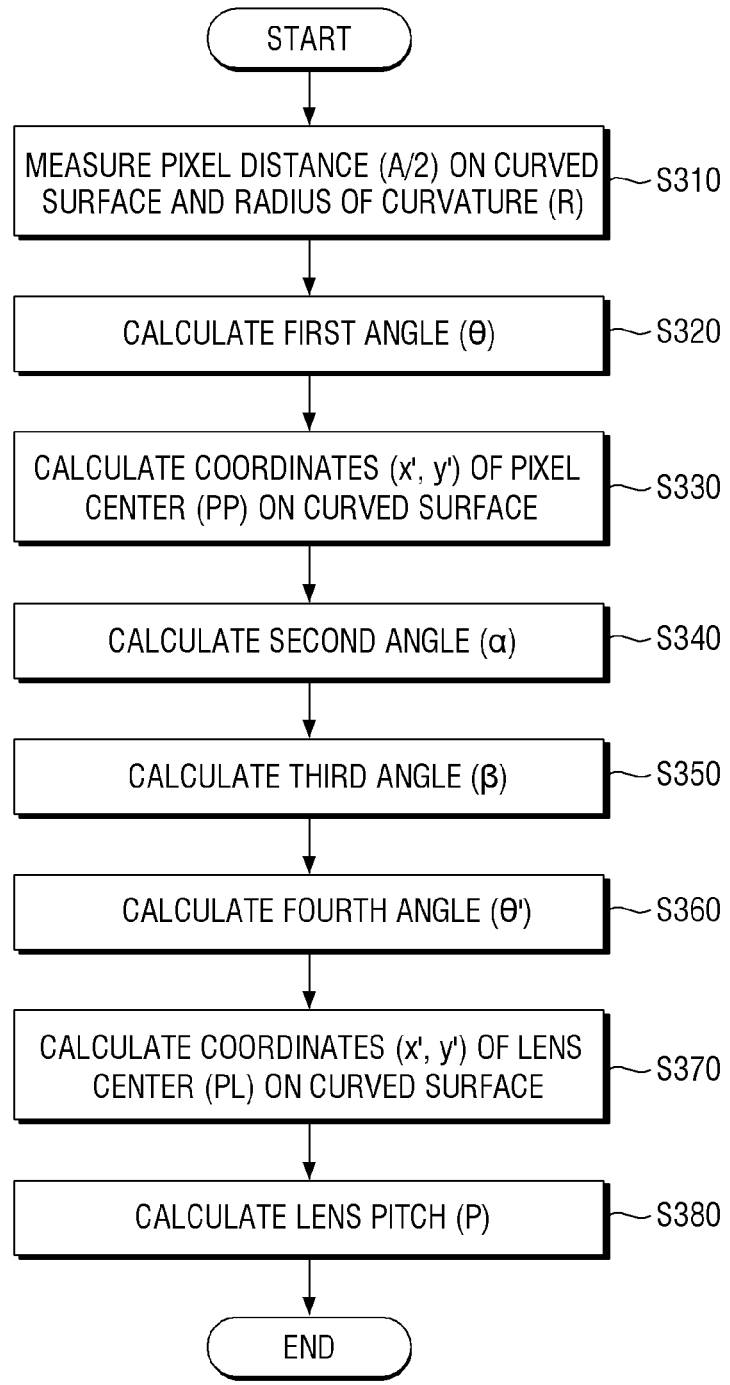
FIG. 21 is a flowchart for illustrating another embodiment of processes for calculating a plurality of lens pitches in a display device according to the invention.

FIG. 21 is a flowchart for illustrating another embodiment of processes for calculating a plurality of lens pitches in a display device according to the invention.

Referring to FIG. 21, a pixel distance A/2 on a curved surface and a radius of curvature R of the display panel 200 may be measured (operation S310). The pixel distance A/2 on the curved surface may be defined as the distance on the curved surface between the center CP of the display panel 200 and the pixel center PP corresponding to the outermost lens center CL.

The first angle θ may be calculated using the radius of curvature R of the display panel 200 and the pixel distance A/2 on the curved surface (R×θ=A/2) (operation S320).

The coordinates (x', y') of the pixel center PP may be calculated using the radius of curvature R and the first angle θ (x', y'=R×sin θ, R×cos θ) (operation S330).

As expressed in Equation 7 above, the second angle α may be calculated based on the x-axis coordinate (x') of the pixel center PP, the y-axis coordinate (y') of the pixel center PP, and the distance Y between the origin O and the target observation point PD (operation S340).

As expressed in Equation 8 above, a third angle β may be calculated based on the second angle α, the radius of curvature R of the display panel 200, the lens-pixel distance L, the distance Y between the origin O and the target observation point PD (operation S350).

The fourth angle θ' may be calculated using the second angle α and the third angle β (operation S360).

The display device 10_3 may calculate the coordinates (x, y) of the lens center PL on the curved surface (operation S370).

The lens pitch may be calculated based on the coordinates of the lens center PL of each of the plurality of lenses 320 (operation S380).

As the lens pitches P are different from one another, the display device 10_3 may have the extended line passing through the lens center PL of each of the lenses 320 and the pixel center PP of the display panel 200 corresponding to the lens center PL reach the target observation point PD.

What is claimed is:
1. A display device comprising:
   a display panel comprising a plurality of pixels each including a light emitting layer; and
   a stereoscopic lens comprising a curved base disposed on a surface of the display panel with a predetermined radius of curvature, and a plurality of lenses each having a convex shape and disposed on the curved base and inclined from a side of the display panel,
   wherein a thickness of the curved base supporting a lens disposed at a center of the stereoscopic lens among the plurality of lenses is smaller than a thickness of the curved base supporting a lens disposed at a distal side of the stereoscopic lens among the plurality of lenses.

2. The display device of claim 1, wherein a radius of surface curvature of each of the plurality of lenses increases as a distance from the center of the stereoscopic lens increases.

3. The display device of claim 1, wherein a thickness of each of the plurality of lenses decreases as a distance from the center of the stereoscopic lens increases.

4. The display device of claim 1, wherein a distance between the light emitting layer and each of the plurality of lenses increases as a distance from a center of the display panel increases.

5. The display device of claim 1, wherein video areas of each of the plurality of lenses are overlapped each other, and wherein a width of video areas of each of the plurality of lenses is reduced as a distance from the center of the stereoscopic lens increases.

6. The display device of claim 1, wherein the thickness of the curved base of the stereoscopic lens is determined based on a refractive index of the curved base, a refractive index between the light emitting layer and the curved base, a distance between the light emitting layer and the curved base, a refractive index of the plurality of lenses, a thickness of each of the plurality of lenses, and an object distance of each of the plurality of lenses.

7. The display device of claim 6, wherein the thickness of the curved base of the stereoscopic lens is determined according to following equation:

$$T1 = n1 \times \left\{ d1 - \left( \frac{T2}{n2} + \frac{T3}{n3} \right) \right\}$$

where T1 denotes the thickness of the curved base of the stereoscopic lens, n1 denotes the refractive index of the curved base, d1 denotes the object distance of each of the plurality of lenses, T2 denotes the distance between the light emitting layer and the curved base, n2 denotes the refractive index between the light emitting layer and the curved base, T3 denotes the thickness of each of the plurality of lenses, and n3 denotes the refractive index of the plurality of lenses.

8. The display device of claim 1, wherein a thickness of each of the plurality of lenses is determined based on a radius of surface curvature of each of the plurality of lenses and a lens pitch.

9. The display device of claim 8, wherein the thickness of each of the plurality of lenses is determined according to following equation:

$$T3 = R1 - \sqrt{R1^2 - \left(\frac{P}{2}\right)^2}$$

wherein T3 denotes the thickness of each of the plurality of lenses, R1 denotes the radius of surface curvature of each of the plurality of lenses, and P denotes the lens pitch.

* * * * *